(12) United States Patent
Hosaka

(10) Patent No.: US 8,908,985 B2
(45) Date of Patent: *Dec. 9, 2014

(54) IMAGE PROCESSING INCLUDING ENCODING INFORMATION CONCERNING THE MAXIMUM NUMBER OF SIGNIFICANT DIGITS HAVING LARGEST ABSOLUTE VALUE OF COEFFICIENT DATA IN GROUPS

(71) Applicant: Sony Corporation, Tokyo (JP)

(72) Inventor: Kazuhisa Hosaka, Tokyo (JP)

(73) Assignee: Sony Corporation, Tokyo (JP)

( * ) Notice: Subject to any disclaimer, the term of this patent is extended or adjusted under 35 U.S.C. 154(b) by 94 days.

This patent is subject to a terminal disclaimer.

(21) Appl. No.: 13/716,654

(22) Filed: Dec. 17, 2012

(65) Prior Publication Data

US 2013/0163892 A1 Jun. 27, 2013

(30) Foreign Application Priority Data

Dec. 21, 2011 (JP) ................................. 2011-280577

(51) Int. Cl.
*G06K 9/36* (2006.01)
*G06T 9/00* (2006.01)
*G06K 9/46* (2006.01)

(52) U.S. Cl.
CPC ...................................... *G06T 9/005* (2013.01)
USPC ....................................................... 382/246

(58) Field of Classification Search
USPC ............. 382/232, 233, 246, 251; 358/426.01, 358/426.16; 348/384, 466; 341/59, 67; 375/130, 147, 335
See application file for complete search history.

(56) References Cited

U.S. PATENT DOCUMENTS

| 5,852,469 | A  | * | 12/1998 | Nagai et al. | ............... | 375/240.23 |
|---|---|---|---|---|---|---|
| 6,738,525 | B1 | * | 5/2004 | Iwata | ............................. | 382/246 |
| 6,954,555 | B2 | * | 10/2005 | Shimada | ........................ | 382/246 |
| 8,160,377 | B2 | * | 4/2012 | Tani et al. | ..................... | 382/251 |
| 2013/0163892 | A1 | * | 6/2013 | Hosaka | ......................... | 382/246 |
| 2013/0163893 | A1 | * | 6/2013 | Hosaka | ......................... | 382/251 |

FOREIGN PATENT DOCUMENTS

JP 2004-166254 6/2004

* cited by examiner

*Primary Examiner* — Amir Alavi
(74) *Attorney, Agent, or Firm* — Frommer Lawrence & Haug LLP; William S. Frommer

(57) ABSTRACT

An image processing apparatus includes: a number of significant digits coding unit encoding information concerning the maximum number of significant digits as the number of significant digits of coefficient data having the largest absolute value in each of groups set in units of the predetermined number of plural coefficient data generated from image data; a zero-run coding unit encoding zero-run formed by a group including only coefficient data a value of which is "0"; an absolute value coding unit encoding absolute values of respective coefficient data other than zero-run with respect to each group; and a sign coding unit encoding positive and negative signs of respective coefficient data other than zero-run with respect to each group.

18 Claims, 25 Drawing Sheets

FIG.3

| | | | |
|---|---|---|---|
| − + − + | + + + + | − + − − | + − − + |
| 0 0 0 0 | 0 0 0 0 | 0 0 0 0 | 1 0 0 1 |
| 1 0 1 1 | 0 1 0 0 | 1 1 0 1 | 1 1 1 0 |
| 0 1 1 1 | 1 1 0 0 | 1 1 0 0 | 0 0 1 0 |
| 1 1 1 0 | 1 1 0 1 | 0 0 1 1 | 1 1 1 0 |
| 3 | 3 | 3 | 4 |

BIT-PLANE EXPRESSED QUANTIZED COEFFICIENTS

VALUES OF THE MAXIMUM NUMBER OF QUANTIZED COEFFICIENTS B (INITIAL VALUE OF B IS "0")

- 1 (QUANTIZED COEFFICIENTS OF LINE TO BE ENCODED FROM NOW ARE NOT ALL "0")
- 1 (CHANGE IN B)
- 0 (INCREASE B)
- 001 (INCREASED AMOUNT OF B IS 3)
- 101 011 110 010 (ABSOLUTE VALUES OF W-PIECES OF QUANTIZED COEFFICIENTS)
- 1010 (SIGNS OF W-PIECES OF QUANTIZED COEFFICIENTS WHICH ARE NOT "0")
- 0 (NO CHANGE IN B)
- 011 110 000 011 (ABSOLUTE VALUES OF W-PIECES OF QUANTIZED COEFFICIENTS)
- 001 (SIGNS OF W-PIECES OF QUANTIZED COEFFICIENTS WHICH ARE NOT "0")
- 1 (CHANGE IN B)
- 0 (INCREASE B)
- 1 (INCREASED AMOUNT OF B IS 1)
- 1101 0100 0111 1010 (ABSOLUTE VALUES OF W-PIECES OF QUANTIZED COEFFICIENTS)
- 0101 (SIGNS OF W-PIECES OF QUANTIZED COEFFICIENTS WHICH ARE NOT "0")

FIG.4

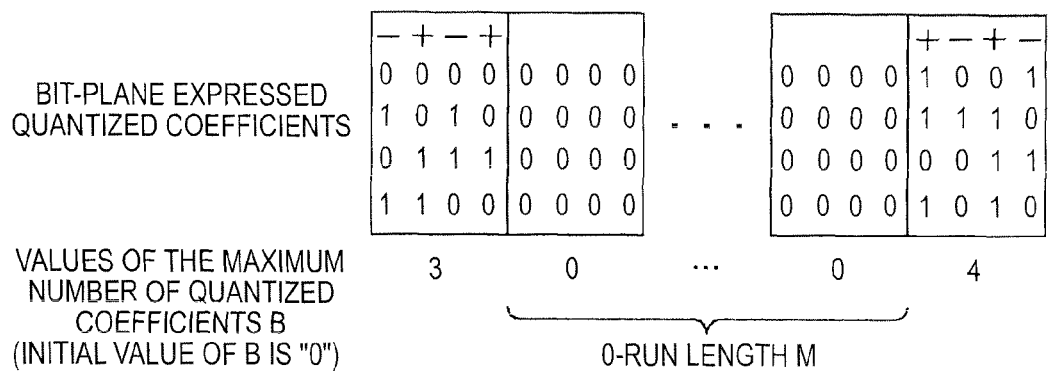

BIT-PLANE EXPRESSED QUANTIZED COEFFICIENTS

VALUES OF THE MAXIMUM NUMBER OF QUANTIZED COEFFICIENTS B
(INITIAL VALUE OF B IS "0")

0-RUN LENGTH M 1 (QUANTIZED COEFFICIENTS OF LINE TO BE ENCODED FROM NOW ARE NOT ALL "0")

1 (CHANGE IN B)
0 (INCREASE B)
001 (INCREASED AMOUNT OF B IS 3)
101 011 110 010 (ABSOLUTE VALUES OF W-PIECES OF QUANTIZED COEFFICIENTS)
1010 (SIGNS OF W-PIECES OF QUANTIZED COEFFICIENTS WHICH ARE NOT "0")

1 (CHANGE IN B)
1 (REDUCE B)
00 (REDUCED AMOUNT OF B IS 3)

00···0, M(0-RUN LENGTH CODE, THE NUMBER OF DIGITS IN BINARY EXPRESSION OF COUNT VALUE AND VALUE THEREOF)

0001 (INCREASED AMOUNT OF B IS 4)
1101 0100 0111 1010 (ABSOLUTE VALUES OF W-PIECES OF QUANTIZED COEFFICIENTS)
0101 (SIGNS OF W-PIECES OF QUANTIZED COEFFICIENTS WHICH ARE NOT "0")

FIG.5

| 0-RUN LENGTH | BINARY EXPRESSION | CODE |
|---|---|---|
| 1 | 1 | 1 |
| 2 | 10 | 01,0 |
| 3 | 11 | 01,1 |
| 4 | 100 | 001,00 |
| 5 | 101 | 001,01 |
| 6 | 110 | 001,10 |
| 7 | 111 | 001,11 |
| 8 | 1000 | 0001,000 |
| ⋮ | ⋮ | ⋮ |
| 15 | 1111 | 0001,111 |
| ⋮ | ⋮ | ⋮ |

FIG.6

|  | − + − + | | |
|---|---|---|---|
| BIT-PLANE EXPRESSED QUANTIZED COEFFICIENTS | 0 0 0 0 \| 0 0 0 0<br>1 0 1 0 \| 0 0 0 0<br>0 1 1 1 \| 0 0 0 0<br>1 1 0 0 \| 0 0 0 0 | . . . | 0 0 0 0<br>0 0 0 0<br>0 0 0 0<br>0 0 0 0 |

VALUES OF THE MAXIMUM NUMBER OF QUANTIZED COEFFICIENTS B (INITIAL VALUE OF B IS "0")     3      0     ...     0

0-RUN LENGTH M 1 (QUANTIZED COEFFICIENTS OF LINE TO BE ENCODED FROM NOW ARE NOT ALL "0")

1 (CHANGE IN B)
0 (INCREASE B)
001 (INCREASED AMOUNT OF B IS 3)
101 011 110 010 (ABSOLUTE VALUES OF W-PIECES OF QUANTIZED COEFFICIENTS)
1010 (SIGNS OF W-PIECES OF QUANTIZED COEFFICIENTS WHICH ARE NOT "0")

1 (CHANGE IN B)
1 (REDUCE B)
00 (REDUCED AMOUNT OF B IS 3)

00···01 (0-RUN LENGTH CODE (END)), (THE NUMBER OF DIGITS OF (COUNT VALUE-1) IN BINARY EXPRESSION AND 1)

FIG.7

| 0-RUN LENGTH | BINARY EXPRESSION | CODE | REMARKS |
|---|---|---|---|
| 1 | 1 | NON | B=0 MEANS THAT "0" IS FIXED TO END OF LINE |
| 2 | 10 | 01 | PREFIX OF CODE INDICATING ZERO-RUN OF 2 OR MORE |
| 3 | 11 | 001 | PREFIX OF CODE INDICATING ZERO-RUN OF 4 OR MORE |
| 4 | 100 | 001 | PREFIX OF CODE INDICATING ZERO-RUN OF 4 OR MORE |
| 5 | 101 | 0001 | PREFIX OF CODE INDICATING ZERO-RUN OF 8 OR MORE |
| 6 | 110 | 0001 | PREFIX OF CODE INDICATING ZERO-RUN OF 8 OR MORE |
| 7 | 111 | 0001 | PREFIX OF CODE INDICATING ZERO-RUN OF 8 OR MORE |
| 8 | 1000 | 0001 | PREFIX OF CODE INDICATING ZERO-RUN OF 8 OR MORE |
| 9 | 1001 | 00001 | PREFIX OF CODE INDICATING ZERO-RUN OF 16 OR MORE |
| 10 | 1010 | 00001 | PREFIX OF CODE INDICATING ZERO-RUN OF 16 OR MORE |
| 11 | 1011 | 00001 | PREFIX OF CODE INDICATING ZERO-RUN OF 16 OR MORE |
| 12 | 1100 | 00001 | PREFIX OF CODE INDICATING ZERO-RUN OF 16 OR MORE |
| 13 | 1101 | 00001 | PREFIX OF CODE INDICATING ZERO-RUN OF 16 OR MORE |
| 14 | 1110 | 00001 | PREFIX OF CODE INDICATING ZERO-RUN OF 16 OR MORE |
| 15 | 1111 | 00001 | PREFIX OF CODE INDICATING ZERO-RUN OF 16 OR MORE |
| 16 | 10000 | 00001 | PREFIX OF CODE INDICATING ZERO-RUN OF 16 OR MORE |

FIG.8

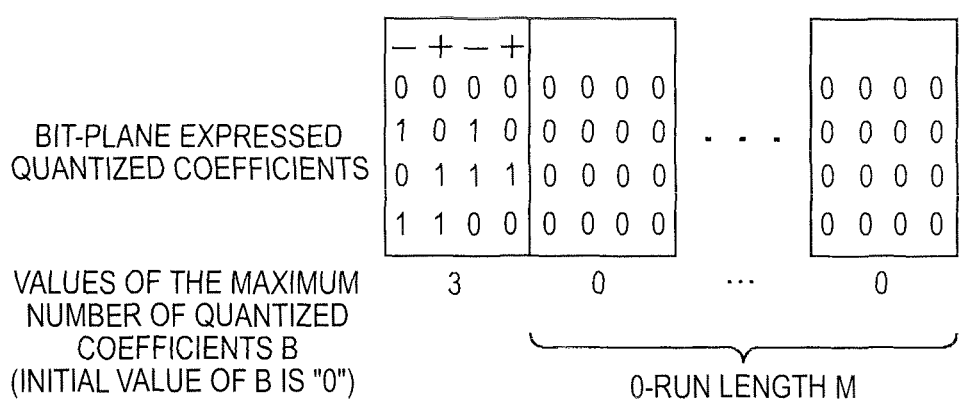

BIT-PLANE EXPRESSED QUANTIZED COEFFICIENTS

VALUES OF THE MAXIMUM NUMBER OF QUANTIZED COEFFICIENTS B (INITIAL VALUE OF B IS "0")

0-RUN LENGTH M 1 (QUANTIZED COEFFICIENTS OF LINE TO BE ENCODED FROM NOW ARE NOT ALL "0")

1 (CHANGE IN B)
0 (INCREASE B)
001 (INCREASED AMOUNT OF B IS 3)
101 011 110 010 (ABSOLUTE VALUES OF W-PIECES OF QUANTIZED COEFFICIENTS)
1010 (SIGNS OF W-PIECES OF QUANTIZED COEFFICIENTS WHICH ARE NOT "0")

1 (CHANGE IN B)
1 (REDUCE B)
00 (REDUCED AMOUNT OF B IS 3)

00···0 (0-RUN LENGTH CODE (END)), (THE NUMBER OF DIGITS OF (COUNT VALUE-1) IN BINARY EXPRESSION)

FIG.9

| 0-RUN LENGTH | BINARY EXPRESSION | CODE | REMARKS |
|---|---|---|---|
| 1 | 1 | NON | B=0 MEANS THAT "0" IS FIXED TO END OF LINE |
| 2 | 10 | 0 | PREFIX OF CODE INDICATING ZERO-RUN OF 2 OR MORE |
| 3 | 11 | 00 | PREFIX OF CODE INDICATING ZERO-RUN OF 4 OR MORE |
| 4 | 100 | 00 | PREFIX OF CODE INDICATING ZERO-RUN OF 4 OR MORE |
| 5 | 101 | 000 | PREFIX OF CODE INDICATING ZERO-RUN OF 8 OR MORE |
| 6 | 110 | 000 | PREFIX OF CODE INDICATING ZERO-RUN OF 8 OR MORE |
| 7 | 111 | 000 | PREFIX OF CODE INDICATING ZERO-RUN OF 8 OR MORE |
| 8 | 1000 | 000 | PREFIX OF CODE INDICATING ZERO-RUN OF 8 OR MORE |
| 9 | 1001 | 0000 | PREFIX OF CODE INDICATING ZERO-RUN OF 16 OR MORE |
| 10 | 1010 | 0000 | PREFIX OF CODE INDICATING ZERO-RUN OF 16 OR MORE |
| 11 | 1011 | 0000 | PREFIX OF CODE INDICATING ZERO-RUN OF 16 OR MORE |
| 12 | 1100 | 0000 | PREFIX OF CODE INDICATING ZERO-RUN OF 16 OR MORE |
| 13 | 1101 | 0000 | PREFIX OF CODE INDICATING ZERO-RUN OF 16 OR MORE |
| 14 | 1110 | 0000 | PREFIX OF CODE INDICATING ZERO-RUN OF 16 OR MORE |
| 15 | 1111 | 0000 | PREFIX OF CODE INDICATING ZERO-RUN OF 16 OR MORE |
| 16 | 10000 | 0000 | PREFIX OF CODE INDICATING ZERO-RUN OF 16 OR MORE |

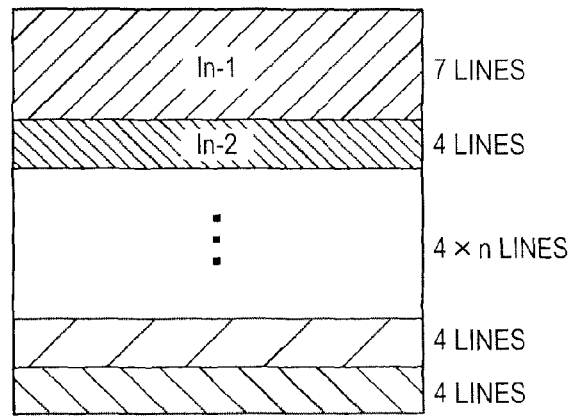
FIG.27A IMAGE INPUT
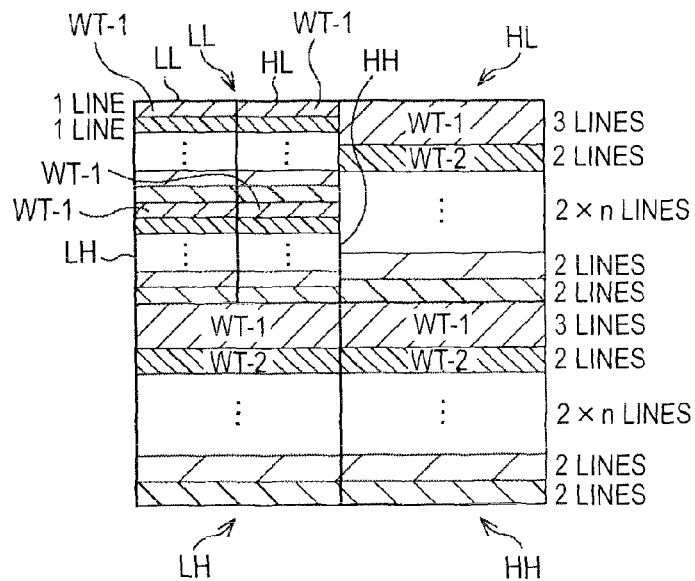
FIG.27B WAVELET TRANSFORM RESULT (ANALYSIS)
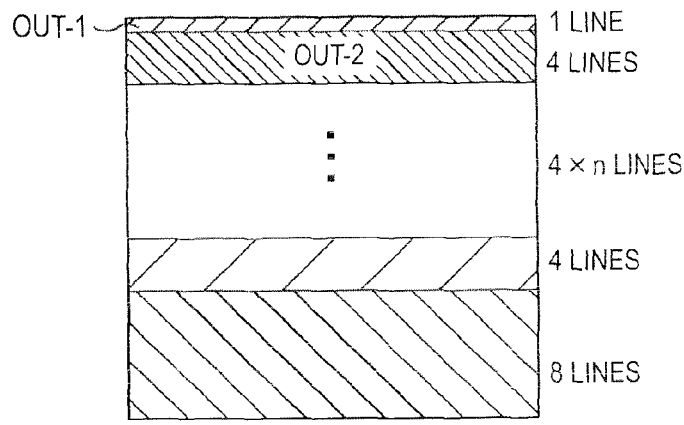
FIG.27C IMAGE OUTPUT

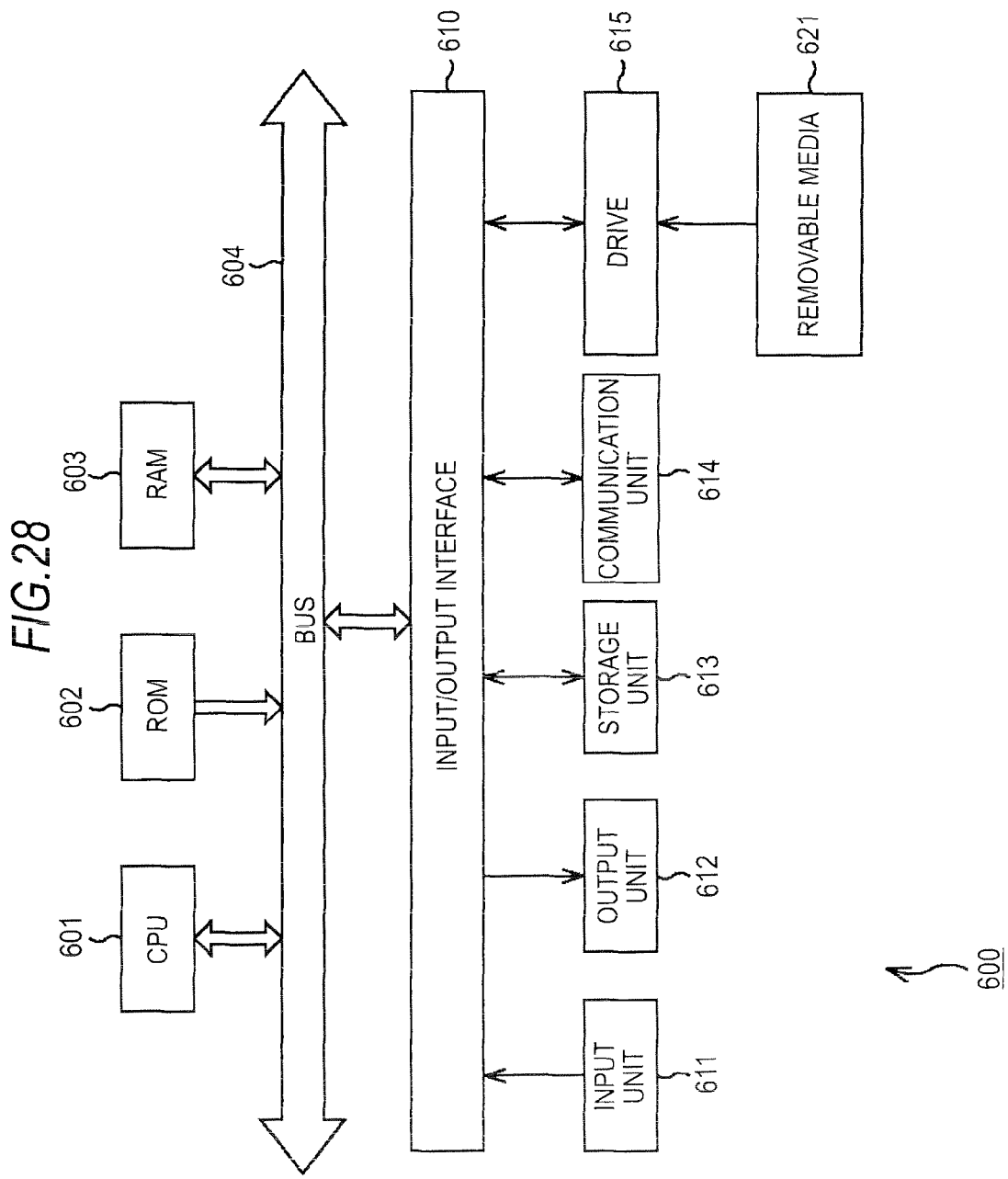

IMAGE PROCESSING INCLUDING ENCODING INFORMATION CONCERNING THE MAXIMUM NUMBER OF SIGNIFICANT DIGITS HAVING LARGEST ABSOLUTE VALUE OF COEFFICIENT DATA IN GROUPS

FIELD

The present disclosure relates to an image processing apparatus and an image processing method, and particularly relates to an image processing apparatus and an image processing method capable of performing coding or decoding more easily.

BACKGROUND

JEPG (Joint Photographic Experts Group) 2000 is known as a coding method of encoding coefficients of respective sub-bands (frequency bands) generated by performing band division processing with respect to an inputted image when coding the image (data).

When an image is encoded by the JPEG 2000 method, wavelet coefficients obtained by performing wavelet transform to the inputted image are quantized, and entropy coding is further performed to the quantized coefficients obtained by quantization.

In the entropy coding in related art, bit modeling called EBCOT (Embedded Block Coding with Optimized Truncation) and arithmetic coding called MQ coder are performed. That is, the bit modeling of quantized coefficients is performed and arithmetic coding is further performed with respect to each bit plane based on plural coding passes. Then, codes obtained by the arithmetic coding are outputted as the encoded image (data) (for example, refer to JP-A-2004-166254 (Patent Document 1).

When the image encoded by the JPEG 2000 method is decoded, processing is performed in the order inverse to procedures performed at the time of coding. More specifically, entropy decoding is performed to the codes as encoded image data and inverse quantization is performed, and wavelet inverse transform is further performed to the quantized coefficients obtained by the inverse quantization. Then, the image obtained by the wavelet inverse transform is outputted as the decoded image.

SUMMARY

However, as the processing amount in EBCOT and MQ coder is large in the above described technique, it is difficult to perform coding/decoding of images at high speed, and thus it is necessary to prepare expensive dedicated hardware for coding (or decoding) an HD (High Definition) image having high resolution such as 1920 pixels in the horizontal direction and 1080 pixels in the vertical direction in real time.

In view of the above, it is desirable to encode/decode images more easily.

An embodiment of the present disclosure is directed to an image processing apparatus including a number of significant digits coding unit encoding information concerning the maximum number of significant digits as the number of significant digits of coefficient data having the largest absolute value in each of groups set in units of the predetermined number of plural coefficient data generated from image data, a zero-run coding unit encoding zero-run formed by a group including only coefficient data a value of which is "0", an absolute value coding unit encoding absolute values of respective coefficient data other than zero-run with respect to each group, and a sign coding unit encoding positive and negative signs of respective coefficient data other than zero-run with respect to each group.

The zero-run coding unit may generate a code including codes "0" corresponding to a number obtained by subtracting 1 from the number of digits of the number of groups forming zero-run in binary expression and the number of groups in binary expression.

The zero-run coding unit may generate a code including codes "0" corresponding to the number of digits of a number in binary expression obtained by subtracting 1 from the number of groups forming zero-run and a code "1", when the zero-run continues to the end of a line to be processed.

The zero-run coding unit may generate a code including codes "0" corresponding to the number of digits of a number in binary expression obtained by subtracting 1 from the number of groups forming zero-run, when the zero-run continues to the end of a line to be processed.

The number of significant digits coding unit may generate a code indicating a variation between the maximum number of significant digits in a present group to be processed and the maximum number of significant digits in a previous group processed last time.

The number of significant digits coding unit may generate codes "0" corresponding to a number obtained by subtracting 1 from the variation as a code indicating the variation and the code "1" indicating the end of change.

The number of significant digits coding unit may generate only codes "0" corresponding to a number obtained by subtracting 1 from the variation as a code indicating the variation when the maximum number of significant digits in the present group is "0".

The number of significant digits coding unit may further generate a code indicating whether the maximum number of significant digits in the present group has been changed from the maximum number of significant digits in the previous group as well as a code indicating whether the maximum number of significant digits in the present group has been increased or reduced as compared with the maximum number of significant digits in the previous group.

The number of significant digits coding unit may further generate the code indicating whether the maximum number of significant digits in the present group has been changed from the maximum number of significant digits in the previous group as well as the code indicating whether the maximum number of significant digits in the present group has been increased or reduced as compared with the maximum number of significant digits in the previous group only when the maximum number of significant digits of the previous group is not "0".

The image processing apparatus may further includes a wavelet transform unit performing wavelet transform to image data, and a quantization unit quantizing wavelet coefficients obtained by performing wavelet transform to image data by the wavelet transform unit, in which the number of significant digits coding unit, the zero-run coding unit, the absolute value coding unit and the sign coding unit respectively encode quantized coefficients obtained by quantizing the wavelet coefficients by the quantization unit.

The embodiment of the present disclosure is also directed to an image processing method of an image processing apparatus, including encoding information concerning the maximum number of significant digits as the number of significant digits of coefficient data having the largest absolute value in each of groups set in units of the predetermined number of plural coefficient data generated from image data by a number of significant digits coding unit, encoding zero-run formed by a group including only coefficient data a value of which is "0" by a zero-run coding unit, encoding absolute values of respective coefficient data other than zero-run with respect to each group by an absolute value coding unit, and encoding positive and negative signs of respective coefficient data other than zero-run with respect to each group by a sign coding unit.

Another embodiment of the present disclosure is directed to an image processing apparatus including a number of significant digits decoding unit decoding a code generated in each of groups set in units of the predetermined number of plural coefficient data, which indicates the maximum number of significant digits as the number of significant digits of coefficient data having the largest absolute value in each group, a zero-run decoding unit decoding a code indicating zero-run formed by a group including only coefficient data a value of which is "0", an absolute value decoding unit decoding a code indicating absolute values of respective coefficient data, which has been generated with respect to each group of coefficient data other than zero-run, and a sign decoding unit decoding a code indicating positive and negative signs of respective coefficient data, which has been generated with respect to each group of coefficient data other than zero-run.

The zero-run decoding unit may decode the code indicating zero-run when the maximum number of significant digits in a present group to be processed is "0" as the result of decoding by the number of significant digits decoding unit.

The zero-run decoding unit may perform a first reading in which codes are sequentially read until a code "1" is read or codes are read to the end of a line, may perform a second reading in which codes corresponding to the number of codes "0" read in the first reading are further read in the case where zero-run indicated by the codes read in the first reading does not reach the end of the line, and may generate the number of coefficient data with the value "0" corresponding to a number binary expression of which is equivalent to a code string obtained by adding the code "1" to the head of the codes read in the first reading.

The zero-run decoding unit may generate coefficient data the value of which is "0" corresponding to a number reaching the end of the line in the case where zero-run indicated by the codes read in the first reading reaches the end of the line.

The number of significant digits decoding unit may sequentially read codes until the code "1" is read after the second reading by the zero-run decoding unit, and may set a number obtained by adding 1 to the number of read codes "0" to the maximum number of significant digits of a group subsequent to the group forming zero-run.

The image processing apparatus may further include an inverse quantization unit performing inverse quantization to quantization coefficients values of which are "0" obtained as a result of decoding by the zero-run decoding unit, or quantized coefficients including absolute values obtained as a result of decoding by the absolute value decoding unit and signs obtained as a result of decoding by the sign decoding unit, and a wavelet inverse transform unit performing wavelet inverse transform to wavelet coefficients obtained by inversely quantizing the quantized coefficients by the inverse quantization unit.

The another embodiment of the present disclosure is also directed to an image processing method of an image processing apparatus including, decoding a code generated in each of groups set in units of the predetermined number of plural coefficient data, which indicates the maximum number of significant digits as the number of significant digits of coefficient data having the largest absolute value in each group by a number of significant digits decoding unit, decoding a code indicating zero-run formed by a group including only coefficient data a value of which is "0" by a zero-run decoding unit, decoding a code indicating absolute values of respective coefficient data, which has been generated with respect to each group of coefficient data other than zero-run by an absolute value decoding unit, and decoding a code indicating positive and negative signs of respective coefficient data, which has been generated with respect to each group of coefficient data other than zero-run by a sign decoding unit.

In the embodiment of the present disclosure, the predetermined number of plural coefficient data generated from image data is set as a group, and information concerning the maximum number of significant digits as the number of significant digits of coefficient data having the largest absolute value in each group is encoded, zero-run formed by a group including only coefficient data a value of which is "0" is encoded, absolute values of respective coefficient data other than zero-run are encoded with respect to each group, and positive and negative signs of respective coefficient data other than zero-run are encoded with respect to each group.

In the another embodiment of the present disclosure, a code generated in each of groups set in units of the predetermined number of plural coefficient data, which indicates the maximum number of significant digits as the number of significant digits of coefficient data having the largest absolute value in each group is decoded, a code indicating zero-run formed by a group including only coefficient data a value of which is "0" is decoded, a code indicating absolute values of respective coefficient data, which has been generated with respect to each group of coefficient data other than zero-run is decoded, and a code indicating positive and negative signs of respective coefficient data, which has been generated with respect to each group of coefficient data other than zero-run is decoded.

According to the embodiments of the present disclosure, images can be processed. In particular, images can be encoded or decoded more easily.

BRIEF DESCRIPTION OF THE DRAWINGS

FIG. 3 is a view showing an example of quantized coefficients to be encoded;

FIG. 4 is a view showing an example of zero-run coding;

FIG. 5 is a table for explaining an example of codes of zero-run;

FIG. 6 is a view showing another example of zero-run coding;

FIG. 7 is a table for explaining another example of codes of zero-run;

FIG. 8 is a view showing further another example of zero-run coding;

FIG. 9 is a table for explaining further another example of codes of zero-run;

FIGS. 27A to 27C are diagrams for explaining an example of the flow of coding/decoding; and FIG. 28 is a block diagram showing a main configuration example of a personal computer.

DETAILED DESCRIPTION

Hereinafter, modes for carrying out the present disclosure (hereinafter referred to as embodiments) will be explained. The explanation will be made in the following order.

1. First Embodiment (Image Coding Apparatus)
2. Second Embodiment (Image Decoding Apparatus)
3. Third Embodiment (Image Coding Apparatus/Image Decoding Apparatus)
4. Fourth Embodiment (Personal Computer)

1. First Embodiment

[Image Coding Apparatus]

Figure 1:
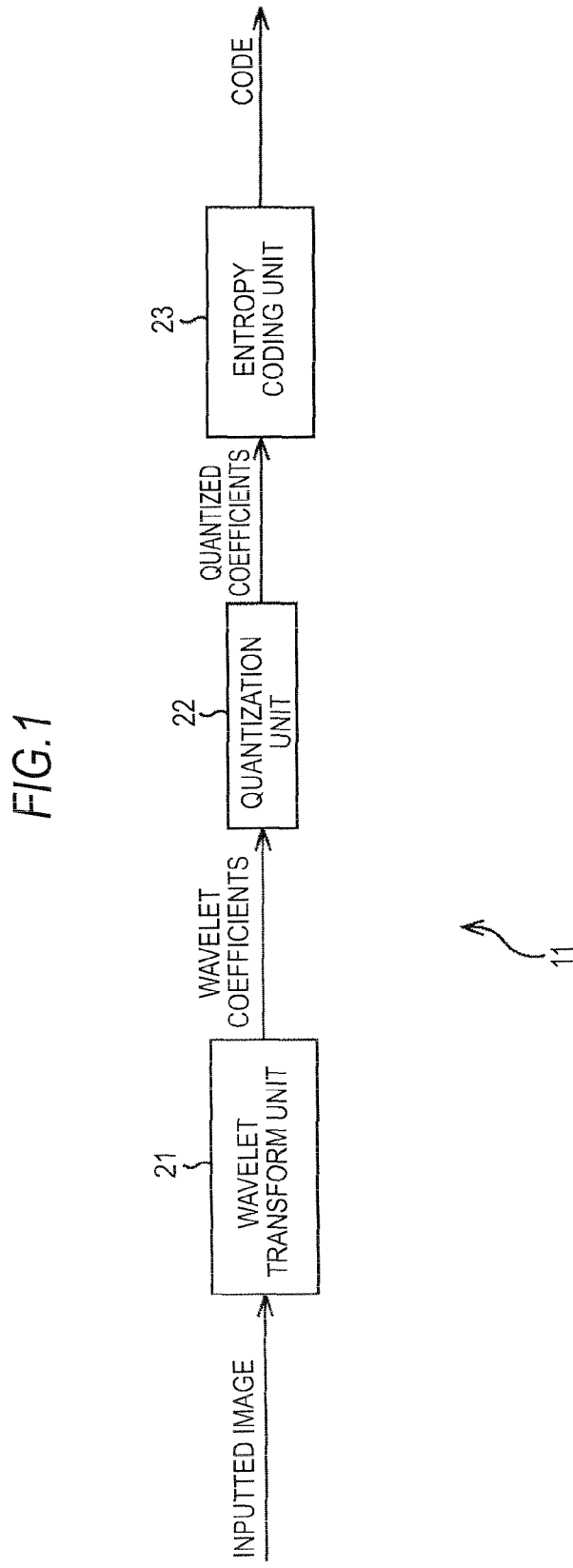
FIG. 1 is a block diagram showing a main configuration example of an image coding apparatus.

FIG. 1 is a block diagram showing a main configuration example of an image coding apparatus. An image coding apparatus 11 is an image processing apparatus which encodes image data and outputs the obtained encoded data.

As shown in FIG. 1, the image coding apparatus 11 includes a wavelet transform unit 21, a quantization unit 22 and an entropy coding unit 23.

To the wavelet transform unit 21, for example, an image (data) which is a component signal to which DC level shifting is performed according to need is inputted. The wavelet transform unit 21 performs wavelet transform to the inputted image and divides the image into plural sub-bands. The wavelet transform unit 21 supplies wavelet coefficients of the sub-bands obtained by the wavelet transform to the quantization unit 22.

The quantization unit 22 quantizes wavelet coefficients supplied from the wavelet transform unit 21 and supplies the quantized coefficients obtained as the result of quantization to the entropy coding unit 23.

The entropy coding unit 23 performs entropy coding to the quantized coefficients supplied from the quantization unit 22 and outputs a code obtained by the entropy coding as an encoded image (encoded data). The image (encoded data) outputted from the entropy coding unit 23 is, for example, recorded in packets or supplied to another apparatus (not shown) connected to the image coding apparatus 11 after rate control processing is performed.

The entropy coding unit 23 performs coding of the quantized coefficients as explained below. Accordingly, the entropy coding unit 23 realizes easier coding.

Next, entropy coding performed by the entropy coding unit 23 of FIG. 1 will be explained with reference to FIG. 2 and FIG. 3.

Figure 2:
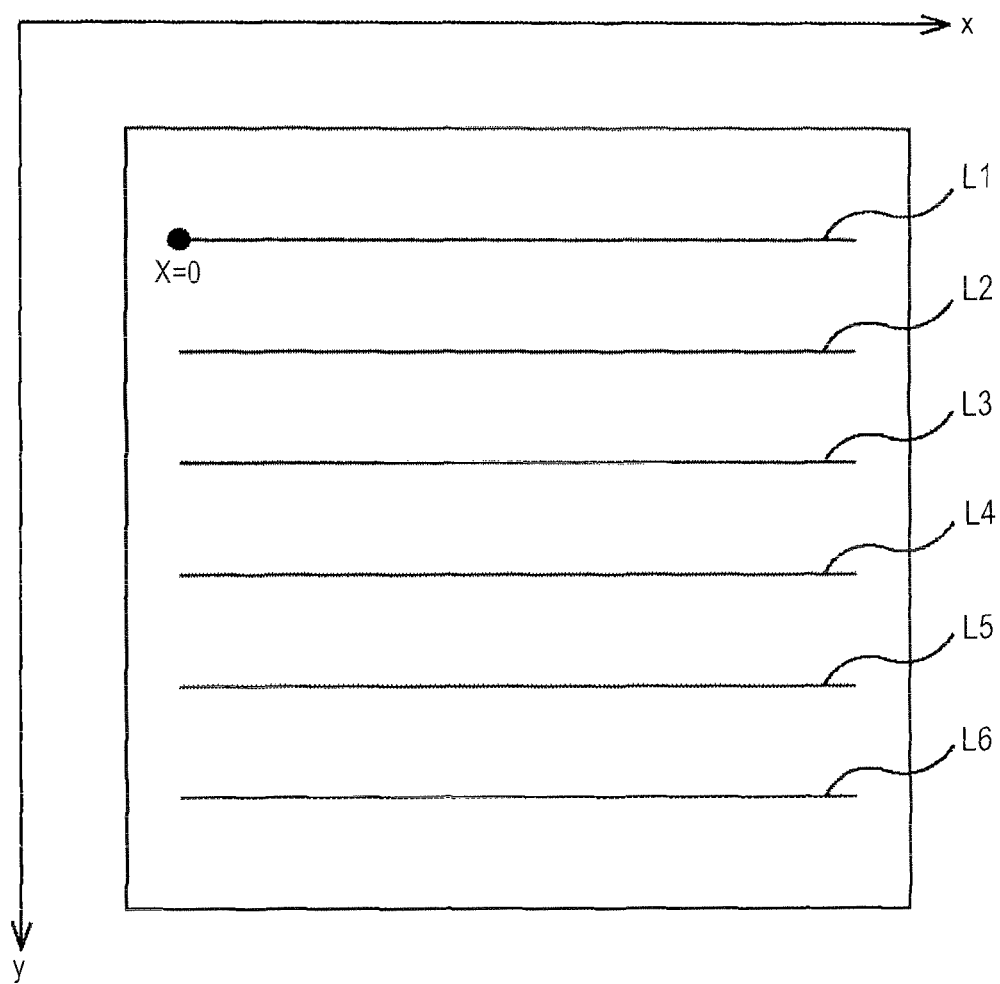
FIG. 2 is a view for explaining a sub-band.

FIG. 2 is a view for explaining the sub-band. For example, as shown in FIG. 2, assume that one sub-band includes six lines which are a line L1 to a line L6 and that a position corresponding to a pixel on a line in xy coordinates is (x, y). Here, an x-coordinate at the leftmost position is "0" and a y-coordinate on the line L1 is "0" in respective lines in the drawing.

The quantized coefficients at respective positions (x, y) of the sub-band which are expressed in bit-planes are inputted from the quantization unit 22 to the entropy coding unit 23 in Raster scan order from the line L1 to the line L6.

In other words, the quantized coefficient corresponding to the leftmost position (0, 0) on the line L1 is first inputted to the entropy coding unit 23. Next, the quantized coefficient corresponding to the right-hand neighbor (1, 0) of the position (0, 0) is inputted to the entropy coding unit 23, then, the quantized coefficients corresponding to right-hand neighbor of the position where the quantized coefficient has been inputted are sequentially inputted to the entropy coding unit 23 until reaching the rightmost position on the line L1.

Then, when all the quantized coefficients at positions on the line L1 are inputted, quantized coefficients corresponding to respective positions on the line L2 are inputted to the entropy coding unit 23 sequentially from the leftmost position (0, 1) on the line L2 to the rightmost position, and similarly from the line L3 to the line L6, quantized coefficients corresponding to positions on respective lines are inputted to the entropy coding unit 23.

For example, as shown on an upper left in the drawing of FIG. 3, when 12 quantized coefficients are inputted to the entropy coding unit 23 sequentially from the quantized coefficient at the leftmost position on the line L1 of FIG. 2, the entropy coding unit 23 encodes quantized coefficients in units of a predetermined number "w" (w=4 in FIG. 3) of quantized coefficients.

Here, respective quantized coefficients shown on the upper left of FIG. 3 are expressed in a manner in which absolute values of the codes are divided into digits of binary numbers (expressed in bit-planes). In the example of FIG. 3, quantized coefficients in one line (line L1 of FIG. 2) "−0101", "+0011", "−0110", "+0010", "+0011", "+0110", "0000", "−0011", "+1101", "−0100", "+0111" and "−1010" are sequentially inputted to the entropy coding unit 23.

One quantized coefficient includes a sign of the quantized coefficient represented by "+" (positive) and "−" (negative) and an absolute value of the quantized coefficient represented by a binary number. In FIG. 3, in respective bits representing values of respective digits of absolute values of the quantized coefficients, the uppermost bits in the drawing represent highest-order bits (bits of the highest digit). Accordingly, for example, the quantized coefficient "−0101" has a sign "−" and an absolute value represented by a binary number "0101", therefore, the quantized coefficient is "−5" when represented by a decimal number.

First, the entropy coding unit 23 determines whether (absolute values) of quantized coefficients in inputted one line are all "0 (zero)" or not, and outputs a code indicating whether quantized coefficients in the line to be encoded from now are all "0" or not in accordance with the determination result.

When determining that the quantized coefficients are all "0", the entropy coding unit 23 outputs "0" as the code indicating whether quantized coefficients in the line are all "0" or not and ends the coding of the quantized coefficients in the line which is processed now. On the other hand, when determining that values of the quantized coefficients are not all "0" (are not all quantized coefficients of "0"), the entropy coding unit 23 outputs "1" as the code indicating whether quantized coefficients in the line are all "0" or not.

In the case where 12 quantized coefficients shown on the upper left in the drawing are inputted, the quantized coefficients of the inputted line are not all "0", therefore, the entropy coding unit 23 outputs "1" as shown on an upper right.

When the code "1" indicating that the quantized coefficients are not all "0" is outputted as the code indicating whether the quantized coefficients of the line are all "0" or not, the entropy coding unit 23 encodes the first four (W-pieces) quantized coefficients "−0101", "+0011", "−0110" and "+0010".

The entropy coding unit 23 compares the maximum number of significant digits (a value of a variable B in FIG. 3) of four successive quantized coefficients inputted this time with the maximum number of significant digits of four (W-pieces) quantized coefficients encoded (inputted) last time, determining whether the maximum number of significant digits has been changed or not and outputting a code indicating the maximum number of significant digits of quantized coefficients.

Here, the maximum number of significant digits indicates the number of significant digits of a quantized coefficient having the largest absolute value in four (W-pieces) quantized coefficients to be encoded as a group. In other words, the maximum number of significant digits indicates where "1" is positioned, which is in the highest order of the quantized coefficient having the largest absolute value in four quantized coefficients. Accordingly, for example, the maximum number of significant digits of the four quantized coefficients to be encoded as a group which are "−0101", "+0011", "−0110" and "+0010" will be "3" which is a digit of "1" positioned in the highest order of "−0110" as the quantized coefficient having the largest absolute value.

The code indicating the maximum number of significant digits of the quantized coefficients includes a code indicating whether the maximum number of significant digits has been changed or not, a code indicating whether the maximum number of significant digits has been increased or reduced and a code indicating a variation of the maximum number of significant digits. When the maximum number of significant digits has not been changed, the code indicating whether the maximum number of significant digits has been increased or reduced and the code indicating the variation of the maximum number of significant digits are not outputted.

After the comparison of the maximum number of significant digits, the entropy coding unit 23 outputs a code "1" indicating that the maximum number of significant digits has been changed when the maximum number of significant digits has been changed, and outputs a code "0" indicating that the maximum number of significant digits has not been changed when the maximum number of significant digits has not been changed.

In the case of determining whether the maximum number of significant digits has been changed or not, when four quantized coefficients are first inputted this time, that when quantized coefficients of the sub-band to be encoded are first inputted (for example, four quantized coefficients are inputted in order from the left end of the line L1 of FIG. 2), the quantized coefficients of the sub-band has not been encoded last time, therefore, the maximum number of significant digits of four (W-pieces) quantized coefficients encoded last time is "0".

Accordingly, the entropy coding unit 23 compares the maximum number of significant digits "3" of the four quantized coefficients "−0101", "+0011", "−0110" and "+0010" inputted this time with the maximum number of significant digits "0" of the quantized coefficients which has been encoded last time, outputting the code "1" as the maximum number of significant digits has been changed.

The entropy coding unit 23 outputs the code indicating whether the maximum number of significant digits has been increased or reduced after outputting the code "1" indicating that the maximum number of significant digits has been changed. Here, the entropy coding unit 23 outputs "0" when the maximum number of significant digits is increased and outputs "1" when the maximum number of significant digits has been reduced.

In the example of FIG. 3, the maximum number of significant digits in the previous coding is "0" and the maximum number of significant digits in this time is "3", therefore, the entropy coding unit 23 outputs the code "0" indicating that the maximum number of significant digits has been increased as shown on an upper right in the drawing.

Furthermore, after the code indicating whether the maximum number of significant digits has been increased or reduced is outputted, the entropy coding unit 23 outputs the code indicating to what degree the maximum number of significant digits has been increased or reduced, namely, outputs the code indicating the variation of the maximum number of significant digits. Specifically, when the variation (that is, an increased amount or a reduced amount) of the maximum number of significant digits is "n", the entropy coding unit 23 outputs (n−1) pieces of codes "0", and then, outputs the code "1" following these "0"s.

In the case where the first four quantized coefficients of FIG. 3 are encoded, the variation of the maximum number of significant digits is "3" (=3-0), therefore, the entropy coding unit 23 outputs "2" (=3-1) pieces of "0"s and further outputs "1" as codes.

Next, the entropy coding unit 23 outputs codes corresponding to the maximum number of significant digits indicating respective absolute values of the four (W-pieces) quantized coefficients to be encoded this time. That is, the entropy coding unit 23 outputs the code indicating values of respective digits of the absolute value of each quantized coefficient from the maximum digit to the minimum digit of significant digits shown by the maximum number of significant digits sequentially with respect to respective quantized coefficients.

As the quantized coefficients to be encoded this time are "−0101", "+0011", "−0110" and "+0010", the entropy coding unit 23 outputs a code corresponding to the maximum number of significant digits indicating the absolute value of the quantized coefficient "−0101" which has been inputted first. Here, as the maximum number of significant digits at this time is "3", the entropy coding unit 23 outputs a value "1" which is the maximum digit (namely, the third digit) of significant digits indicated by the maximum number of significant digits of the quantized coefficient "−0101", a value "0" which is a digit (the second digit) one digit lower than the maximum digit and a value "1" which is the lowest-order digit. Accordingly, a code "101" corresponding to the number of significant digits showing the absolute value of the quantized coefficients "−0101" is outputted.

Similarly, the entropy coding unit 23 sequentially outputs codes "011", "110" and "010" corresponding to significant digits indicating absolute values of the quantized coefficients "+0011", "−0110" and "+0010". Therefore, "101011110010" is outputted as a code corresponding to the maximum number of significant digits indicating respective absolute values of quantized coefficients "−0101", "+0011", "−0110" and "+0010". Accordingly, the code having a length corresponding to the maximum number of significant digits of four quantized coefficients to be encoded is outputted from the entropy coding unit 23 as a code indicating the absolute values of the quantized coefficients.

Lastly, the entropy coding unit 23 outputs a code indicating respective signs of quantized coefficients absolute values of which are not "0" in four (W-pieces) of quantized coefficients. Here, the entropy coding unit 23 outputs the code "0" when the sign of the quantized coefficient is "+" (positive), and outputs the code "1" when the sign is "−" (negative)

The quantized coefficients to be encoded this time are "−0101", "+0011", "−0110" and "+0010", and the signs of the quantized coefficients are negative, positive, negative and positive in this order, therefore, the entropy coding unit 23 outputs "1010" as a code indicating respective signs of quantized coefficients as shown at an upper right in the drawing.

When four quantized coefficients inputted for the first time are encoded, the entropy coding unit 23 continuously encodes next successive four quantized coefficients "+0011", "+0110", "0000" and "−0011".

First, the entropy coding unit 23 compares the maximum number of significant digits of four (W-pieces) quantized coefficients newly inputted this time with the maximum number of significant digits of the four quantized coefficients encoded last time in the same manner as in the coding of the quantized coefficients inputted for the first time (last time).

The maximum number of significant digits of the four (W-pieces) quantized coefficients "+0011", "+0110", "0000" and "−0011" inputted this time is "3" which is a digit of "1" positioned in the highest order of the quantized coefficient "+0110" having the largest absolute value, which is the same as the maximum number of significant digits "3" of the quantized coefficient encoded last time, therefore, the entropy coding unit 23 outputs the code "0" indicating that the maximum number of significant digits is not changed.

Subsequently, the entropy coding unit 23 outputs a code "011110000011" in which codes "011", "110", "000" and "011" corresponding to the maximum number of significant digits indicating respective absolute values of the four (W-pieces) quantized coefficients "+0011", "+0110", "0000" and "−0011" to be encoded this time are aligned in this order.

Then, after the code indicating the absolute values of the quantized coefficients is outputted, the entropy coding unit 23 outputs a code indicating respective signs of quantized coefficients the absolute values of which are not "0" in the four quantized coefficients.

The quantized coefficients to be encoded this time are "+0011", "+0110", "0000" and "−0011", and the absolute value of the third quantized coefficient "0000" is "0", therefore, the entropy coding unit 23 outputs a code "001" indicating respective signs (positive, positive, negative) of the quantized coefficients "+0011", "+0110" and "−0011" the absolute values of which are not "0".

After the four quantized coefficients "+0011", "+0110", "0000" and "−0011" are encoded, the entropy coding unit 23 further encodes next four quantized coefficients "+1101", "−0100", "+0111" and "−1010".

First, the entropy coding unit 23 compares the maximum number significant digits of the four (W pieces) quantized coefficients newly inputted this time with the maximum number of significant digits of the four quantized coefficients encoded last time.

The maximum number of significant digits of the four (W-pieces) quantized coefficients "+1101", "−0100", "+0111" and "−1010" inputted this time is "4" which is a digit of "1" positioned in the highest order of the quantized coefficient "+1101" having the largest absolute value, which is different from the maximum number of significant digits "3" of the quantized coefficients encoded last time, therefore, the entropy coding unit 23 outputs the code "1" indicating that the maximum number of significant digits has been changed.

The maximum number of significant digits at the last time is "3" and the maximum number of significant digits at this time is "4", therefore, the code "0" indicating that the maximum number of significant digits has been increased is outputted as shown on a right side of the drawing.

The entropy coding unit 23 outputs a code indicating to what degree the maximum number of significant digits has been increased or reduced. In this case, the variation of the maximum number of significant digits is 1 (=4-3), therefore, the entropy coding unit 23 outputs "0" (1-1) piece of "0" and further outputs "1" as the code (namely, outputs the code "1").

Next, the entropy coding unit 23 outputs a code "1101010001111010" in which codes "1101", "0100", "0111" and "1010" corresponding to the maximum number of significant digits indicating respective absolute values of the four (W-pieces) quantized coefficients "+1101", "−0100", "+0111" and "−1010" to be encoded this time are aligned in this order.

Then, after the code indicating the absolute values of the quantized coefficients is outputted, the entropy coding unit 23 outputs a code indicating respective signs of quantized coefficients the absolute values of which are not "0" in the four quantized coefficients.

The quantized coefficients to be encoded this time are "+1101", "−0100", "+0111" and "−1010", and the signs of these quantized coefficients are positive, negative, positive and negative in this order, therefore, the entropy coding unit 23 outputs a code "0101" as a code indicating respective signs of the quantized coefficients as shown at a lower right in the drawing.

As described above, the entropy coding unit 23 encodes the inputted quantized coefficients in units of the predetermined number (W-pieces) of successive quantized coefficients. Accordingly, the code indicating whether the quantized coefficients in the line to be encoded are all "0" or not is outputted from the entropy coding unit 23. When the code indicating that the quantized coefficients of the line are not all "0" is outputted, the code indicating the maximum number of significant digits of W-pieces quantized coefficients, the code indicating absolute values (bit-plane expression) of W-pieces quantized coefficients and the code indicating signs of these quantized coefficients are outputted.

The above code indicating the maximum number of significant digits of W-pieces quantized coefficients, the code indicating absolute values of W-pieces quantized coefficients and the code indicating signs of these quantized coefficients are repeatedly outputted as codes indicating subsequent W-pieces quantized coefficients until all the quantized coefficients in the line are encoded.

In the above explanation, the quantized coefficients are encoded in Raster scan order, however, it is not always necessary that the order in which the quantized coefficients are encoded is in Raster scan order. For example, when the quantized coefficients of the sub-band shown in FIG. 2 are encoded, it is also possible that quantized coefficients at four positions aligned in the vertical direction in the drawing are sequentially encoded in units of W-pieces of quantized coefficients in such a manner that quantized coefficients at positions (0, 0), (0, 1), (0, 2) and (0, 3) (namely, left-end positions of the line L1 to line L4 in the drawing) are first encoded, then, quantized coefficients at positions (1, 0), (1, 1), (1, 2) and (1, 3) are encoded.

As described above, the entropy coding unit 23 encodes the quantized coefficients of the sub-band in units of the predetermined number of quantized coefficients as a group, outputting the code indicating the maximum number of significant digits of quantized coefficients, the code indicating absolute values of quantized coefficients and the code indicating signs of these quantized coefficients.

When the quantized coefficients of the sub-band are encoded in units of the predetermined number of quantized coefficients as a group as described above, it is not necessary to perform plural processing with respect to each bit plane based on plural coding passes as well as variable-length coding is performed, which differs from, for example, the case where the image is encoded by using the JPEG 2000 method, therefore, the processing amount of coding can be drastically reduced. As a result, it is possible to encode images more speedily and it is possible to realize a coding apparatus for encoding high-resolution images in real time at low costs.

Furthermore, as it is not necessary to encode images by explicitly describing the length of codes in the image coding apparatus 11 when encoding images, a code amount can be reduced and it is not necessary to manage information concerning the length of codes.

In the above explanation, the significant digits of the quantized coefficients having the largest absolute value is a value of a variable Bnew indicating the maximum number of significant digits, however, the value of the variable Bnew may be a value equal to or higher than the significant digit of the quantized coefficient having the largest absolute value in the W-pieces quantized coefficients. When the value of the variable Bnew is increased, the code amount of the code indicating absolute values of the quantized coefficients is increased, however, it is possible to reduce the code amount of the code indicating the maximum number of significant digits of the quantized coefficients by allowing the value of the variable Bnew to be the value equal to or higher than the significant digit of the quantized coefficients having the largest absolute value.

[Zero-Run Processing 1]

In the above coding method, the quantized coefficient with a value "0" is also processed in the same manner as in the case of quantized coefficients the values of which are not "0" unless the quantized coefficients in the line to be processed are all "0". However, the quantized coefficients the values of which are "0" tend to be locally concentrated and continuously appear in many cases.

Accordingly, the entropy coding unit 23 encodes a portion where the quantized coefficients the values of which are "0" continuously appear in a lot. When applying this method, the entropy coding unit 23 can encode such portion of "0" run-length (zero-run) more efficiently than in the case where the group of quantized coefficients the values of which are not "0". That is, the entropy coding unit 23 can improve coding efficiency of encoding coefficient data with many zeros.

More specific explanation will be made below. FIG. 4 is a view showing an example of zero-run coding.

For example, assume that M-groups of four (W-pieces) quantized coefficients continue in a line to be processed as shown in an upper part of FIG. 4. As the line to be processed includes quantized coefficients the values of which are not "0", the first code will be "1".

In FIG. 4, the maximum number of significant digits of the leftmost group of the four (W-pieces) quantized coefficients which will be processed first is "3", therefore, the code "1" indicating that the maximum number of significant digits B has been "changed (diff)" from the initial value "0" is outputted next. Subsequently, the code "0" indicating that "increase B (plus)" is outputted.

The value of the maximum number of significant digits B is increased from "0" to "3" (an increased amount 3), therefore, 2-pieces of codes "0" (the increased amount 3-1) are outputted next, then, the code "1" indicating the end of change (enough) is outputted. That is, the value of the maximum number of significant digits B after change is determined by the detection of the code"1".

Then, a code "101011110010" is outputted, which corresponds to the maximum number of significant digits indicating respective absolute values of four (W-pieces) quantized coefficients "−0101", "+0011", "−0110" and "+0010" to be encoded this time.

Furthermore, a code "1010" is outputted, which indicates signs (positive or negative) of the quantized coefficients the values of which are not "0" in the four (W-pieces) quantized coefficients to be encoded this time.

Then, the target of coding processing is shifted to a group of next four (W-pieces) quantized coefficients. As shown in FIG. 4, in four (W-pieces) quantized coefficients in the second group from the left, values of quantized coefficients are all "0". That is, value of the maximum number of significant digits B is "0". Then, the M-groups (M is an arbitrary natural number) of the maximum number of significant digits B=0 continue (0-run length M).

The entropy coding unit 23 encodes such zero run (0-run length) in a lot as described below.

First, as the maximum number of significant digits B is changed from the value other than "0" (for example, 3) to "0" in the same manner as in the case of the group the maximum number of significant digits B≠0, the code "1" indicating that the maximum number of significant digits B has been "changed (diff)" is outputted. Next, the code "1" indicating that "reduce B (minus)" is outputted.

Subsequently, as the value of the maximum number of significant digits B is reduced from "3" to "0" (a reduced amount 3), 2-pieces of the codes "0" (the reduced amount 3-1) are sequentially outputted.

Here, it is possible to output the code "1" indicating the end of change (enough) in the same manner as in the previous group, however, the value of the maximum number of significant digits B after change is "0", therefore, the output of the code "1" indicating the end of change (enough) can be omitted.

It becomes clear that the value of the maximum number of significant digits B will be "0" by the code indicating the reduced amount of the maximum number of significant digits B (2-pieces of codes "0" in the example of FIG. 4). The minimum value of the maximum number of significant digits B is "0", which is not reduced any more. That is, the value of the maximum number of significant digits B after change is fixed to "0" by the two codes "0".

Accordingly, when the value of the maximum number of significant digits B after change is "0", the code "1" indicating the end of change (enough) is not necessary and can be omitted. Accordingly, the entropy coding unit 23 can reduce the code amount for the output of the code "1" is omitted. That is, the entropy coding unit 23 can improve the coding efficiency.

Next, a code indicating zero-run is outputted. One code "1" is arranged after the codes "0" corresponding to a number obtained by subtracting 1 from the number of digits N which is the length of zero-run (0-run length) M (groups) in binary expression, and further, values of respective digits other than the highest-order bit of the 0-run length in binary expression for fixing binary numbers of N-digits are aligned, which will be a code indicating the zero-run.

The reason why the code does not include the highest-order bit is that the value is inevitably "1". In other words, the 0-run length in binary expression is aligned after the (N−1) pieces of codes "0" may be the code indicating the zero-run. That is, the coding can be easily realized by shifting the 0-run length in binary expression by an amount obtained by subtracting 1 from the number of digits of the 0-run length.

For example, the entropy coding unit 23 previously stores a table (table information) shown in FIG. 5 concerning respective 0-run lengths. The entropy coding unit 23 calculates the length of zero-run (0-run length) M and selects a code corresponding to M by using table information of FIG. 5 to output the code.

In FIG. 5, commas (,) are put in codes for convenience of explanation, however, these commas are not included in actual codes.

As described above, the entropy coding unit 23 can perform coding more efficiently by coding zero-run in a lot. That is, the entropy coding unit 23 can improve coding efficiency of encoding coefficient data with many zeros.

After zero-run is encoded as described above, the coding target is moved to the rightmost group of four (W-pieces) quantized coefficients of FIG. 4.

The maximum number of significant digits B of the group is "4". Therefore, the code indicating the maximum number of significant digits B is outputted. However, as the value of the maximum number of significant digits B is changed from "0" to "4", the code "1" indicating that the maximum number of significant digits B has been "changed (diff)" or the code "0" indicating that "increase B (plus)" may be outputted as the code indicating the maximum number of significant digits B as described above, and it is also possible to omit the output of these codes as the maximum number of significant digits B of the previous group is "0".

As the minimum value of the maximum number of significant digits B is "0", when the maximum number of significant digits B of this group to be processed is changed in the case where the maximum number of significant digits B of the previous group is "0", it is obvious that the change is in an increasing direction. When the maximum number of significant digits B of this group is not changed (remains to be "0"), the group is also included in zero-run, therefore, the code indicating the maximum number of significant digits B is not outputted.

Accordingly, in the case where the maximum number of significant digits B of this group is not "0" as well as the maximum number of significant digits B of the previous group is "0", it is possible to omit the output of the code "1" indicating that B has been "changed (diff)" or the code "0" indicating that "increase B (plus)". Due to the process, the entropy coding unit 23 can reduce the code amount as the output of codes is omitted. That is, the entropy coding unit 23 can improve the coding efficiency.

Next, as the value of the maximum number of significant digits B is increased (an increased amount 4) from "0" to "4", 3-pieces of codes "0" (the increased amount 4-1) are outputted next, and the code "1" indicating the end of change (enough) is subsequently outputted. That is, the value of the maximum number of significant digits B after change is determined by the detection of the code "1".

Then, a code "1101010001111010" is outputted, which corresponds to the maximum number of significant digits indicating respective absolute values of four (W-pieces) quantized coefficients "+1101", "−0100", "+0111" and "−1010" to be encoded this time.

Furthermore, a code "0101" indicating signs (positive or negative) of quantized coefficients the values of which are not "0" in the four (W-pieces) quantized coefficients to be encoded this time is outputted.

[Zero-Run Processing at End]

When zero-run continues to the end (right end) of the line, for example, a further shorter code may be used as described below to thereby reduce the code amount.

FIG. 6 is a view showing another example of zero-run coding. As shown in the example of FIG. 6, it is obvious that the end of zero-run is the end of the line when zero-run continues to the end, therefore, the code indicating the end (code indicating the maximum number of significant digits B) is not necessary.

In other words, it is obvious that zero-run continues to the end of the line when the number of (N−1) pieces of codes "0" is higher than the number of groups which have not been processed in the line to be processed (the number of groups counted from the group to be processed at present to the group at the end of the line) in the above-described code indicating zero-run.

Accordingly, when zero-run continues to the last, a code in which the code "1" is put after the codes "0" corresponding to the number of digits of (0-run length M in binary expression-1) is outputted as a code indicating zero-run, and coding of the line is completed at that point as shown in an example of FIG. 6.

For example, the entropy coding unit 23 previously stores a table (table information) shown in FIG. 7 concerning respective 0-run lengths continuing to the end of the line. The entropy coding unit 23 calculates the length of zero-run (0-run length) M and selects a code corresponding to M by using table information of FIG. 7 to output the code when it is determined that the zero-run continues to the end of the line.

According to the above process, the code amount of the code indicating zero-run can be reduced as compared with the case of the example of FIG. 4. Additionally, the code indicating the maximum number of significant digits B can be also omitted. As a result, the entropy coding unit 23 can further improve the coding efficiency.

In the above-described code indicating zero-run, it becomes clear that the zero-one continues to the end of the line by the number of codes "0". Therefore, it is also possible to omit the code "1" following the codes "0" corresponding to the number of digits of (0-run length M in binary expression-1) in the code indicating zero-run as shown in an example of FIG. 8.

For example, the entropy coding unit 23 previously stores a table (table information) shown in FIG. 9 concerning respective 0-run lengths continuing to the end of the line. The entropy coding unit 23 calculates the length of zero-run (0-run length) M and selects a code corresponding to M by using table information of FIG. 9 to output the code when it is determined that the zero-run continues to the end of the line.

According to the above process, the code amount of the code showing zero-run can be reduced as compared with the case of the example of FIG. 6. As a result, the entropy coding unit 23 can further improve the coding efficiency.

[Entropy Coding Unit]

Figure 10:
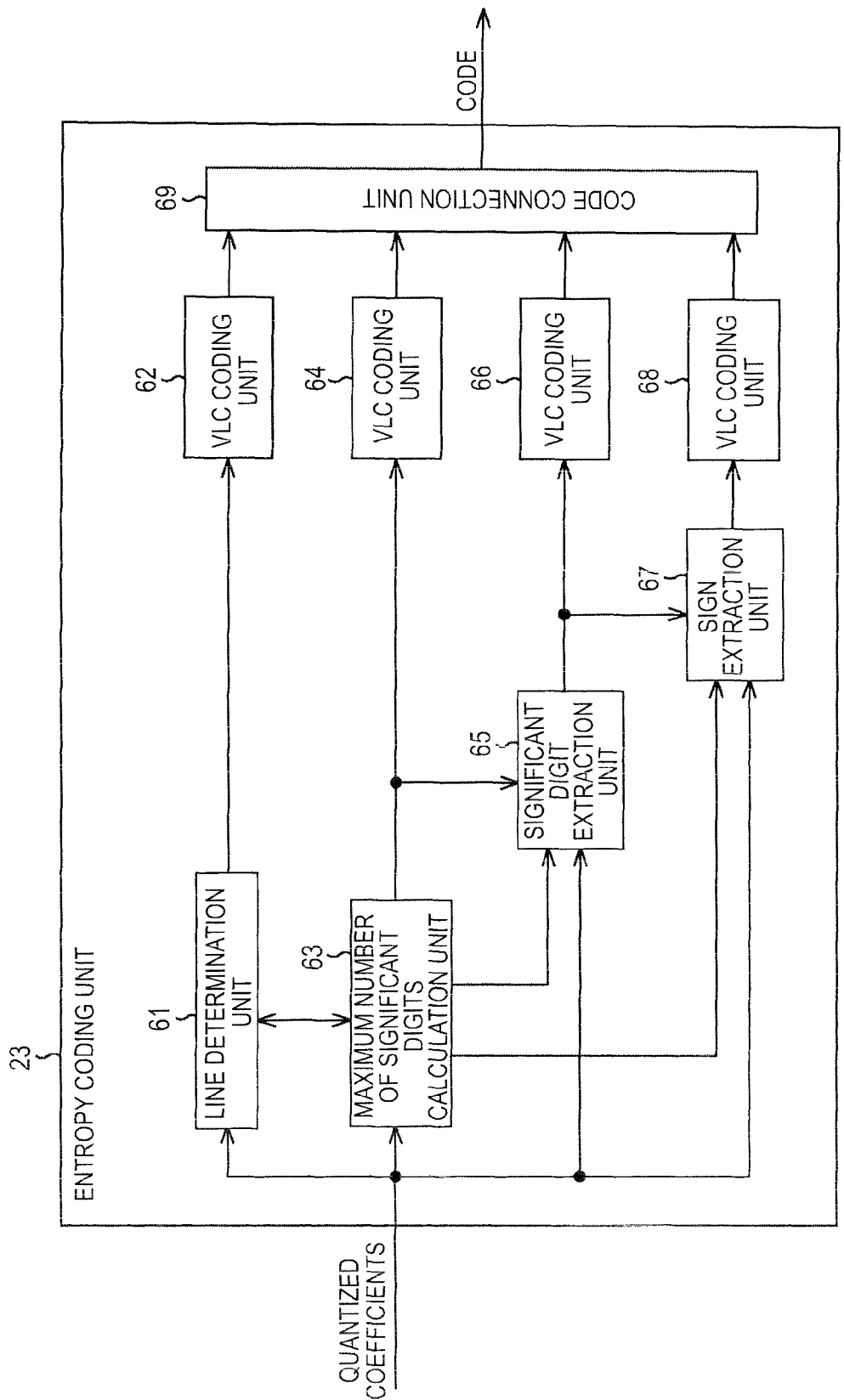
FIG. 10 is a block diagram showing a main configuration example of an entropy coding unit.

A processing unit performing the above coding of zero-run will be specifically explained. FIG. 10 is a block diagram showing a main configuration example of the entropy coding unit 23.

As shown in FIG. 10, the entropy coding unit 23 includes a line determination unit 61, a VLC (Variable Length Coding) coding unit 62, a maximum number of significant digits calculation unit 63, a VLC coding unit 64, a significant digit extraction unit 65, a VLC coding unit 66, a sign extraction unit 67, a VLC coding unit 68 and a code connection unit 69.

The quantized coefficients outputted from the quantization unit 22 as shown in FIG. 1 are supplied (inputted) to the line determination unit 61, the maximum number of significant digits calculation unit 63, the significant digit extraction unit 65 and the sign extraction unit 67.

The line determination unit 61 determines whether the quantized coefficients in one line to be encoded from now which has been inputted from the quantization unit 22 are all "0" or not, supplying information indicating the determination result to the VLC coding unit 62.

The VLC coding unit 62 outputs the code indicating whether the quantized coefficients in the line to be encoded are all "0" or not to the code connection unit 69 based on information indicating the determination result supplied from the line determination unit 61.

The maximum number of significant digits calculation unit 63 calculates the maximum number of significant digits of successive W-pieces quantized coefficients inputted from the quantization unit 22, supplying information indicating the calculation result to the VLC coding unit 64 and the significant digit extraction unit 65.

The VLC coding unit 64 supplies the code indicating the maximum number of significant digits of the W-pieces quantized coefficients to the code connection unit 69 based on information indicating the calculation result supplied from the maximum number of significant digits calculation unit 63. The VLC coding unit 64 also supplies the code indicating zero-run to the code connection unit 69 when there exists zero-run based on information indicating the calculation result supplied from the maximum number of significant digits calculation unit 63.

The significant digit extraction unit 65 extracts significant digits of the W-pieces quantized coefficients supplied from the quantization unit 22 based on the information indicating the calculation result supplied from the maximum number of significant digits calculation unit 63, supplying (data of) the significant digits of the extracted quantized coefficients to the VLC coding unit 66 and the sign extraction unit 67.

The VLC coding unit 66 encodes absolute values of these quantized coefficients based on the significant digits of the quantized coefficients supplied from the significant digit extraction unit 65, supplying the code indicating absolute values of the quantized coefficients obtained as the coding to the code connection unit 69.

The sign extraction unit 67 extracts signs of the quantized coefficients supplied from the quantization unit 22 based on the significant digits of the quantized coefficients from the significant digit extraction unit 65, supplying (data of) the extracted signs to the VLC coding unit 68.

The VLC coding unit 68 encodes (data of) signs from the sign extraction unit 67 and supplies the code indicating signs of the quantized coefficients obtained by the coding to the code connection unit 69.

The code connection unit 69 connects the code indicating whether the quantized coefficients in the line are all "0" or not, the code indicating the maximum number of significant digits as well as the code indicating zero-run or the code indicating absolute values of the quantized coefficients and the code indicating signs of quantized coefficients, which have been supplied from respective units of the VLC coding unit 62, the VLC coding unit 64, the VLC coding unit 66 and the VLC coding unit 68, outputting the code as (data of) the encoded image.

[VLC Coding Unit]

Figure 11:
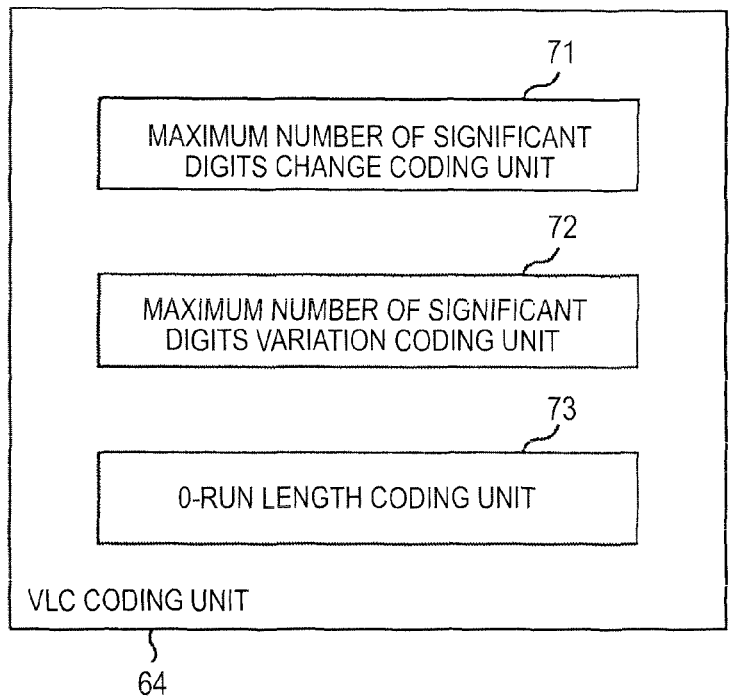
FIG. 11 is a block diagram showing a main configuration example of a VLC coding unit.

FIG. 11 is a block diagram showing a main configuration example of the VLC coding unit 64.

As shown in FIG. 11, the VLC coding unit 64 includes a maximum number of significant digits change coding unit 71, a maximum number of significant digits variation coding unit 72 and a 0-run length coding unit 73.

The maximum number of significant digits change coding unit 71 detects whether the maximum number of significant digits B is changed from the previous group or not, supplying the code indicating existence of change to the code connection unit 69 as the code indicating the maximum number of significant digits.

The maximum number of significant digits variation coding unit 72 calculates a variation when the maximum number of significant digits B is changed from the previous group, supplying the code indicating the variation to the code connection unit 69 as the code indicating the maximum number of significant digits.

The 0-run length coding unit 73 calculates the length (0-run length) of the zero-run when there exists zero-run, supplying the code indicating the length of the zero-run (0-run length) to the code connection unit 69 as the code indicating zero-run.

[Flow of Coding Processing]

Next, the specific flow of processing executed by respective units of the image coding apparatus 11 as described above will be explained.

First, an example of the flow of coding processing by the image coding apparatus 11 (FIG. 1) will be explained with reference to a flowchart of FIG. 12. The coding processing is started when an image (data) to be encoded is inputted to the wavelet transform unit 21.

In Step S11, the wavelet transform unit 21 performs wavelet transform to the inputted image to divide the image into plural sub-bands, supplying wavelet coefficients of each sub-band to the quantization unit 22.

In Step S12, the quantization unit 22 quantizes the wavelet coefficients supplied from the wavelet transform unit 21 and supplies quantized coefficients obtained as the result of quantization to the entropy coding unit 23. Accordingly, for example, quantized coefficients at respective positions of the sub-band which are expressed in bit-planes explained with reference to FIG. 3 are inputted to the entropy coding unit 23.

In Step S13, the entropy coding unit 23 performs entropy coding processing to complete the coding processing. Though the details of the entropy coding processing is described later, the entropy coding unit 23 encodes quantized coefficients supplied from the quantization unit 22 in units of a given number of (W-pieces) of coefficients in the entropy coding processing as explained with reference to FIG. 3, and the code indicating whether the quantized coefficients in the line to be encoded is all "0" or not, the code indicating the maximum number of significant digits of quantized coefficients, the code indicating absolute values of quantized coefficients and the code indicating signs of quantized coefficients are outputted as the encoded image (encoded data).

When zero-run in which quantized coefficients values of which are "0" run on as explained with reference to FIG. 4 to FIG. 9, the entropy coding unit 23 outputs the code indicating zero-run as the encoded image (encoded data) in the entropy coding processing.

The image coding apparatus 11 encodes and outputs the inputted image in the above manner.

[Flow of Entropy Coding Processing]

Next, the entropy coding processing corresponding to the process of Step S13 of FIG. 12 will be explained with reference to a flowchart of FIG. 13.

Figure 12:
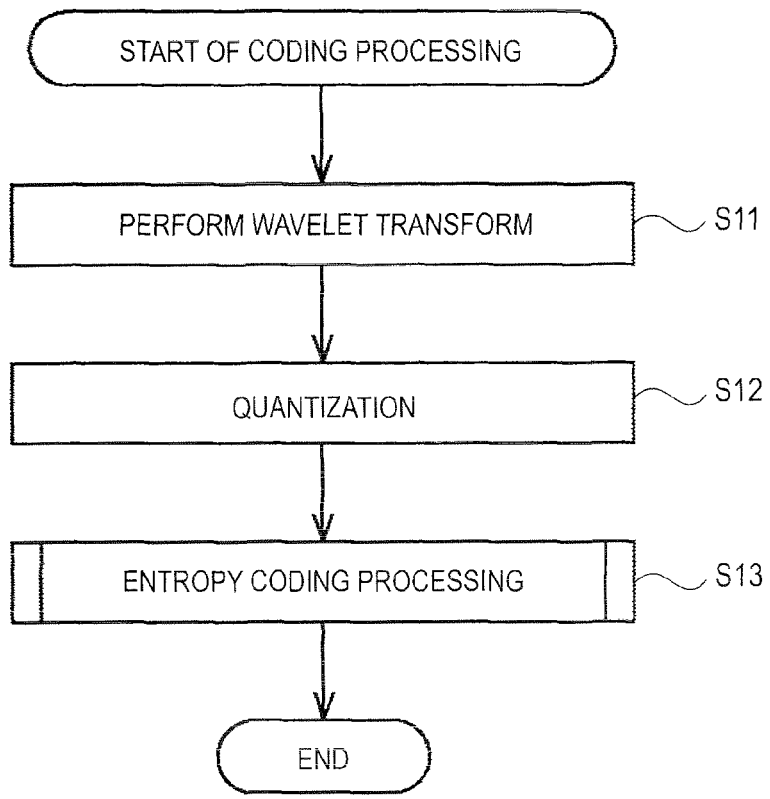
FIG. 12 is a flowchart for explaining an example of the flow of coding processing.

In Step S12 of FIG. 12, the quantized coefficients outputted from the quantized coefficients 22 are supplied (inputted) to the line determination unit 61, the maximum number of significant digits calculation unit 63, the significant digit extraction unit 65 and the sign extraction unit 67 of the entropy coding unit 23 (FIG. 10).

In Step S41, the line determination unit 61 stores a variable "y" indicating the line of the sub-band to be encoded from now as y=0.

For example, when quantized coefficients of the sub-band shown in FIG. 2 are encoded, the line determination unit 61 sets the variable "y" indicating the lines (line L1 to line L6) of the sub-band to y=0. A line "y" shown by the variable "y" in this case indicates the line in which y-coordinates of respective positions (x, y) on the lines of the sub-band are "y". Therefore, for example, when the variable "y" stored by the line determination unit 61 is y=0, the line indicated by the variable is the line L1 in which y-coordinates of respective positions on the line is "0".

In Step S42, the maximum number of significant digits calculation unit 63 stores a variable Binit indicating the maximum number of significant digits of W-pieces of quantized coefficients to be first inputted on a line (y−1) which is one line previous to the line "y" indicated by the variable "y" stored by the line determination unit 61 as Binit=0.

For example, when the line (y−1) is the line L1 shown in FIG. 2, a value of the variable Binit indicating the maximum number of significant digits of W-pieces quantized coefficients to be first inputted on the line (y−1) will be the maximum number of significant digits of W-pieces quantized coefficients counted from positions of the left end of the line L1 in the drawing, namely, W-pieces quantized coefficients at positions (0, 0), (1, 0), . . . , (w−1, 0). When the variable "y" stored in the line determination unit 61 is y=0, the line (y−1) does not exist and the value of the variable Binit will be Binit=0.

In Step S43, the line determination unit 61 determines whether (absolute values) of the quantized coefficients of the line "y" indicated by the stored variable "y" are all "0" or not. For example, when the line "y" is the line L1 shown in FIG. 2, the line determination unit 61 determines that the quantized coefficients are all "0" in the case where quantized coefficients at positions (x, y) on the line L1 are all "0".

When it is determined that the quantized coefficients are all "0" in Step S43, the line determination unit 61 generates information indicating that quantized coefficients are all "0" and supplies the information to the VLC coding unit 62 and the maximum number of significant digits calculation unit 63, then, the process proceeds to Step S44.

In Step S44, the VLC coding unit 62 outputs (supplies) the code "0" indicating that the quantized coefficients in the line to be encoded are all "0" to the code connection unit 69 based on the information indicating that the quantized coefficients from the line determination unit 61 are all "0". The code connection unit 69 outputs the code "0" supplied from the VLC coding unit 62 as a code obtained as a result of coding the quantized coefficients in the line "y" as it is.

In Step S45, the maximum number of significant digits calculation unit 63 updates the stored value of the variable Binit as Binit=0 based on the information indicating that the quantized coefficients are all "0" from the line determination unit 61.

In Step S46, the line determination unit 61 determines whether there exists an unprocessed line or not in lines of the sub-band during encoding. That is, the line determination unit 61 determines whether the quantized coefficients of all lines of the sub-band during encoding have been encoded or not. For example, in the case where the quantized coefficients of the sub-band shown in FIG. 2 are encoded, the line determination unit 61 determines that there is no unprocessed line when quantized coefficients at all positions on the line L1 to the line L6 have been encoded.

When it is determined that there is an unprocessed line in Step S46, the line determination unit 61 proceeds processing to Step S47 for encoding quantized coefficients at respective positions on the next line, namely, a line (y+1)

In Step S47, the line determination unit 61 increments the variable "y" indicating the stored line so as to be y=y+1, and returns the processing to Step S43 to allow the above processing after the Step S43 to be executed again.

On the other hand, when it is determined that there is no unprocessed line in Step S46, the line determination unit ends the entropy coding processing as the quantized coefficients in all lines included in the sub-band have been encoded, and returns the process to Step S13 of FIG. 12 to end the coding processing.

Figure 13:
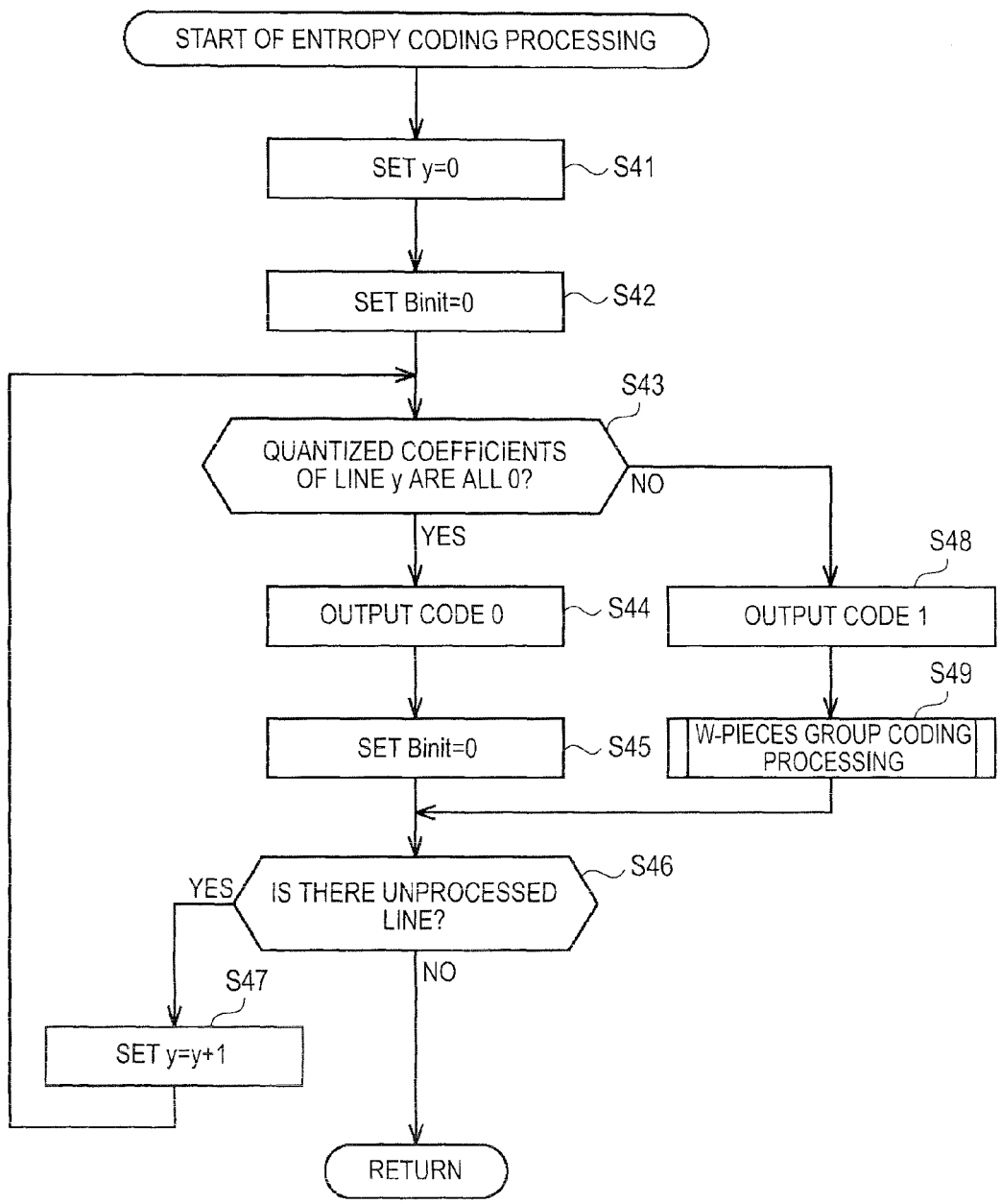
FIG. 13 is a flowchart for explaining an example of the flow of entropy coding processing.

When it is determined that the quantized coefficients in the line "y" are not all "0" (there exists an quantized coefficient the value of which is not "0") in Step S43 of FIG. 13, the line determination unit 61 generates information indicating that the quantized coefficients are not all "0" (there exists an quantized coefficient the value of which is not "0") and supplies the information to the VLC coding unit 62 and the maximum number of significant digits calculation unit 63, then, the process proceeds to Step S48.

In Step S48, the VLC coding unit 62 outputs (supplies) the code "1" indicating that the quantized coefficients in the line to be encoded are not all "0" to the code connection unit based on information indicating that the quantized coefficients are not all "0" from the line determination unit 61.

In Step S49, the entropy coding unit 23 performs W-pieces group coding processing. Though the details of the W-pieces group coding processing will be described later, the entropy coding unit 23 encodes quantized coefficients on the line "y" indicated by the variable "y" stored in the line determination unit 61 in units of successive W-pieces groups in the W-pieces group coding processing.

Here, when assuming that a position on the line "y" specified by the variable "y" stored in the line determination unit 61 and a variable "x" stored in the maximum number of significant digits calculation unit 63 is (x, y), W-pieces successive positions on the line "y" will be successive positions (x, y), (x+1, y), . . . , (x+w−1, y) on the line "y". That is, the entropy coding unit 23 encodes respective quantized coefficients at positions (x, y), (x+1, y), . . . , (x+w−1, y) in the W-pieces group coding processing.

When the W-pieces group coding processing is completed, the entropy coding unit 23 returns the processing to Step S46 and allows subsequent processes to be executed.

As described above, the entropy coding unit 23 encodes the quantized coefficients at respective position of the sub-band in units of predetermined number of quantized coefficients in Raster scan order.

When the quantized coefficients at respective positions of the sub-band are encoded in units of predetermined number in Raster scan order as described above, it is possible to process the inputted quantized coefficients in the inputted order, which can reduce delay occurring by encoding the quantized coefficients.

[Flow of W-pieces Group Coding Processing]

Next, the W-pieces group coding processing corresponding to the process of Step S49 of FIG. 13 will be explained with reference to flowcharts of FIG. 14 and FIG. 15.

When the W-pieces group coding processing is started, the VLC coding unit 64 initializes various types of variables such as i, B, max and so on in Step S71. For example, the VLC coding unit 64 sets values of the variable "i" and "B" to "0" respectively (i=0, B=0), and sets a value of the variable "max" to a number of a W-pieces group of coefficients (max=the number of W-pieces coefficients).

In Step S72, the maximum number of significant digits calculation unit 63 stores the number of significant digits of a quantized coefficient having the largest absolute value in quantized coefficients at successive W-pieces positions (x, y), (x+1, y), . . . , (x+w−1, y) when the position on the line "y" specified by the stored variable "x" is (x, y), as a value of a variable Bnew indicating the maximum number of significant digits of W-pieces of quantized coefficients to be encoded from now.

The maximum number of significant digits calculation unit 63 supplies the calculated maximum number of significant digits of the W-pieces quantized coefficients, namely, the value of the variable Bnew to the VLC coding unit 64 and the significant digit extraction unit 65.

For example, when respective quantized coefficients at W-pieces successive positions are the quantized coefficients "−0101", "+0011", "−0110", "+0010" shown in FIG. 3, the quantized coefficient having the largest absolute value in these quantized coefficients is "−0110", and the significant digit thereof is "3" which is a digit of "1" at the highest order of "−0110", therefore, the value of the variable Bnew is "3".

In Step S73, the maximum number of significant digits change coding unit 71 determines whether Bnew=B or not. That is, the maximum number of significant digits change coding unit 71 determines whether the value of the variable B indicating the maximum number of significant digits of the W-pieces quantized coefficients which has been encoded last time is the same as the value of the variable Bnew or not, which indicates the maximum number of significant digits of the W-pieces quantized coefficients to be encoded from now, which has been supplied from the maximum number of significant digits calculation unit 63.

When it is determined that Bnew is equal to B in Step S73, the maximum number of significant digits change coding unit 71 allows the process to proceed to Step S74, outputting the code "0" indicating that the maximum number of significant digits is not changed as the code indicating the maximum number of significant digits of W-pieces quantized coefficients to be encoded from now to the code connection unit 69. After outputting the code "0" indicating the maximum number of significant digits, the maximum number of significant digits change coding unit 71 omits (skips) respective processes from Step S75 to Step S79 and allows the process to proceed to Step S80.

On the other hand, when it is determined that Bnew is not equal to B in Step S73, the maximum number of significant digits change coding unit 71 allows the process to proceed to Step S75, outputting the code "1" indicating that the maximum number of significant digits has been changed (as the maximum number of significant digits has been changed) to the code connection unit 69.

In Step S76, the maximum number of significant digits change coding unit 71 determines whether the variable Bnew is higher than B or not.

When it is determined that the maximum number of significant digits Bnew of the group (present group) of quantized coefficients to be processed is higher than the maximum number of significant digits B of the group (previous group) of quantized coefficients which has been encoded last time (that the maximum number of significant digits has been increased), the maximum number of significant digits change coding unit 71 allows the process to proceed to Step S77.

In Step S77, the maximum number of significant digits change coding unit 71 outputs the code "0" indicating that the maximum number of significant digits has been increased to the code connection unit 69 as the code indicating the maximum number of significant digits. Subsequently, the maximum number of significant digits variation coding unit 72 outputs (Bnew−B−1)-pieces of codes "0" indicating a variation (an increased amount) of the maximum number of significant digits to the code connection unit 69 as the code indicating the maximum number of significant digits. Then, the maximum number of significant digits variation coding unit 72 allows the process to proceed to step S79.

When it is determined that the maximum number of significant digits Bnew of the present group is lower than the maximum number of significant digits B of the previous group (that the maximum number of significant digits been reduced) in Step S76, the maximum number of significant digits change coding unit 71 allows the process to proceed to Step S78.

In Step S78, the maximum number of significant digits change coding unit 71 outputs the code "1" indicating that the maximum number of significant digits has been reduced to the code connection unit 69 as the code indicating the maximum number of significant digits. Subsequently, the maximum number of significant digits variation coding unit 72 outputs (B−Bnew−1) pieces of codes "0" indicating a variation (a reduced amount) to the code connection unit 69 as codes indicating the maximum number of significant digits. Then, the maximum number of significant digits variation coding unit 72 allows the process to proceed to Step S79.

In Step S79, when the maximum number of significant digits Bnew of the present group is not "0", the maximum number of significant digits variation coding unit 72 outputs the code "1" indicating the end of change (enough) to the code connection unit 69. That is, when the maximum number of significant digits Bnew of the present group is "0", the output of the code "1" is omitted (skipped) in this case. When the code "1" indicating the end of change (enough) is not omitted, the maximum number of significant digits variation coding unit 72 may output the code "1" indicating the end of change (enough) so as to follow (B−Bnew−1)-pieces of codes "0" indicating a variation (the reduced amount) of the maximum number of significant digits B to the code connection unit 69.

Then, the maximum number of significant digits variation coding unit 72 allows the process to proceed to Step S80.

In Step S80, the maximum number of significant digits change coding unit 71 determine whether Bnew≠0 or not. When it is determined that the maximum number of significant digits Bnew of the present group is not "0" (Bnew≠0), the maximum number of significant digits change coding unit 71 allows the process to proceed to Step S81.

In Step S81, the maximum number of significant digits calculation unit 63 sets the value of the variable Bnew as the variable B (sets the value to B=Bnew).

In Step S82, the significant digit extraction unit 65 extracts the significant digits concerning respective quantized coefficients of the i-th W-pieces group of coefficients. The VLC coding unit 66 outputs a code (code in B×W bits) indicating absolute values of significant digits of respective quantized coefficients supplied from the significant digit extraction unit 65 to the code connection unit 69.

In Step S83, the sign extraction unit 67 extracts signs concerning respective quantized coefficients of the i-th W-pieces group of coefficients. The VLC coding unit 68 outputs a code (code in 1×W bit) indicating signs of respective quantized coefficients values of which are not "0" supplied from the sign extraction unit 67 to the code connection unit 69.

In Step S84, the entropy coding unit 23 determines whether the variable "i" is lower than "max−1" or not. That is, the entropy coding unit 23 determines whether all groups of quantized coefficients in the line to be processed have been processed or not.

When it is determined that "i" is lower than "max−1" and there exists an unprocessed group in the line to be processed, the entropy coding unit 23 allows the process to proceed to Step S85.

In Step S85, the entropy coding unit 23 increments the variable "i" (variable "i"=i+1) and returns the process to Step S72.

When it is determined that the variable "i" is not lower than "max−1" and there is not unprocessed group in the line to be processed in Step S84, the entropy coding unit 23 ends the W-pieces group coding processing.

Figure 15:
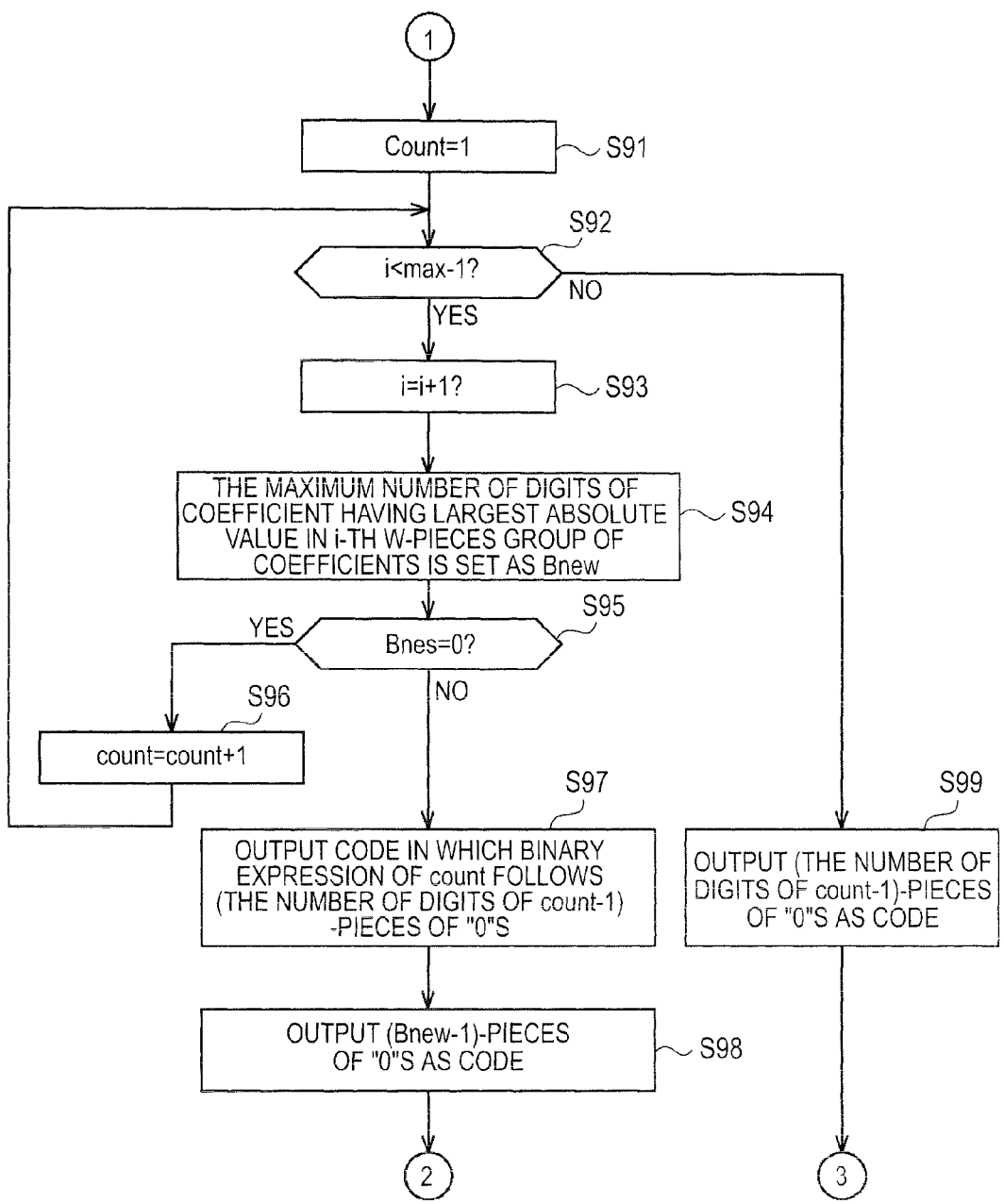
FIG. 15 is a flowchart continued from FIG. 14 explaining the example of the flow of W-pieces group coding processing.

When it is determined that the maximum number of significant digits Bnew of the present group is "0" (Bnew=0) in Step S80, the maximum number of significant digits change coding unit 71 allows the process to Step S91 of FIG. 15.

In Step S91, the 0-run length coding unit 73 sets the value of a variable "count" to "1" (count=1).

In Step S92, the entropy coding unit 23 determines whether the variable "i" is lower than "max−1" or not. That is, the entropy coding unit 23 determines whether all groups of quantized coefficients in the line to be processed have been processed or not.

When it is determined that "i" is lower than "max−1" and there exists an unprocessed group in the line to be processed, the entropy coding unit 23 allows the process to proceed to Step S93. In Step S93, the entropy coding unit 23 increments the variable "i" (variable "i"=i+1) and allows the process to proceed to Step S94.

In Step S94, the maximum number of significant digits calculation unit 63 stores the number of significant digits of the quantized coefficient having the largest absolute value in quantized coefficients at successive W-pieces positions (x, y), (x+1, y), (x+w−1, y) when the position on the line "y" specified by the stored variable "x" is (x, y), as a value of the variable Bnew indicating the maximum number of significant digits of W-pieces of quantized coefficients to be encoded from now.

In Step S95, the 0-run length coding unit 73 determines whether the maximum number of significant digits of the present group is "0" (Bnew=0) or not. When it is determined that the maximum number of significant digits of the present group is "0" (Bnew=0), the 0-run length coding unit 73 allows the process to proceed to Step S96.

In Step S96, the 0-run length coding unit 73 increments the variable "count" (variable "count"=count+1) which is a count value of the number of groups of zero-run and returns the processing to Step S92 and allows subsequent processes to be executed.

That is, respective processes from Step S92 to Step S96 are repeated until the zero-run ends (until it is determined that Bnew is not "0" in Step S95.

When it is determined that the maximum number of significant digits of the present group is not "0" (Bnew≠0) in Step S95, the 0-run length coding unit 73 allows the process to proceed to Step S97.

In Step S97, the 0-run length coding unit 73 outputs a code indicating zero-run to the code connection unit 69, in which the variable "count" in binary expression follows (the number of digits of the variable "count"−1)-pieces of codes "0" as shown in the rightmost column of the table of FIG. 5.

In Step S98, the maximum number of significant digits change coding unit 71 outputs (Bnew−1)-pieces of codes "0" which indicate the increased amount of the maximum number of significant digits B to the code connection unit 69. Here, the code "1" indicating the end of change (enough) is omitted (skipped). When the code "1" indicating the end of change (enough) is not omitted, the maximum number of significant digits change coding unit 71 may output the code "1" indicating the end of change (enough) so as to follow (Bnew−1)-pieces of codes "0" indicating the increased amount of the maximum number of significant digits B to the code connection unit 69.

Figure 14:
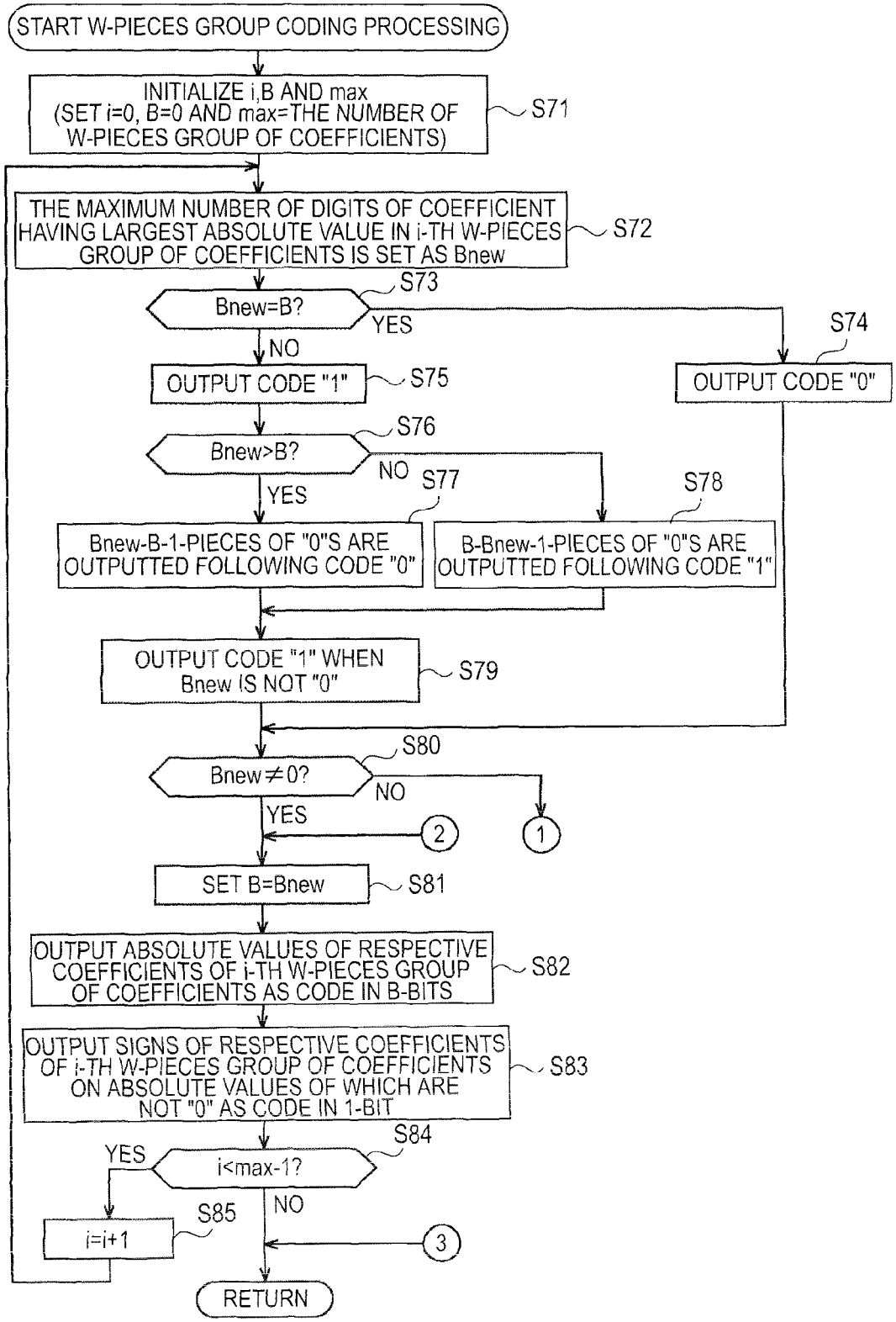
FIG. 14 is a flowchart for explaining an example of the flow of W-pieces group coding processing.

After the process of Step S98 ends, the maximum number of significant digits change coding unit 71 returns the processing to Step S81 of FIG. 14 and allows subsequent processes to be executed.

When it is determined that the variable "i" is not lower than "max−1" and there is no unprocessed group in the line to be processed in Step S92 of FIG. 15, the entropy coding unit 23 allows the process to proceed to Step S99. In this case, zero-run reaches the end of the line.

Accordingly, the 0-run length coding unit 73 outputs (the number of digits of variable "count"−1)-pieces of codes "0", for example, as shown in the third column from the left in the table of FIG. 9 as the code indicating zero-run to the count connection unit 69 in Step S99. Here, it is also possible to output the code in which the code "1" follows (the number of digits of variable "count"−1)-pieces of codes "0", for example, as shown in the third column from the left in the table of FIG. 7 as the code indicating zero-run.

When the process of Step S99 ends, the 0-run length coding unit 73 returns the process to FIG. 14 and ends the W-pieces group coding processing (returns the process to Step S46 of FIG. 13).

As described above, the entropy coding unit 23 encodes quantized coefficients of the sub-band in units of a predetermined number of quantized coefficients, outputting the code indicating the maximum number of significant digits of quantized coefficients, the code indicating absolute values of quantized coefficients and the code indicating signs of quantized coefficients.

Accordingly, it is not necessary to perform plural processing with respect to each bit plane based on plural coding passes as well as variable-length coding is performed, which is different from the case of encoding images by, for example, the JPEG2000 method, therefore, the processing amount of coding can be drastically reduced. As a result, the image coding apparatus 11 can encode images more easily and can realize the coding apparatus for encoding images with high resolution in real time at low costs.

Furthermore, it is not necessary to encode images by explicitly describing the length of codes in the image coding apparatus 11, therefore, the code amount can be reduced and it is not necessary to manage information of the length of codes.

Additionally, as the successive groups including only quantized coefficients values of which are "0" are encoded as zero-run as described above, the image coding apparatus 11 can further improve coding efficiency of encoding coefficient data with many zeros.

Though the explanation has been made in the above description so that the number of significant digits of the quantized coefficient having the largest absolute value in W-pieces quantized coefficients is set as a value of the variable Bnew indicating the maximum number of significant digits, the value of the variable Bnew may be a value equal to or higher than the number of significant digit of the quantized coefficient having the largest absolute value in W-pieces quantized coefficients. The higher the value of the variable Bnew becomes, the larger the code amount of the code indicating absolute values of quantized coefficients becomes, however, the code amount of the code indicating the maximum number of significant digits of the quantized coefficients can be reduced by setting the variable Bnew to the value equal to or higher than the number of significant digits of the quantized coefficient having the largest absolute value.

2. Second Embodiment

[Image Decoding Apparatus]

Figure 16:
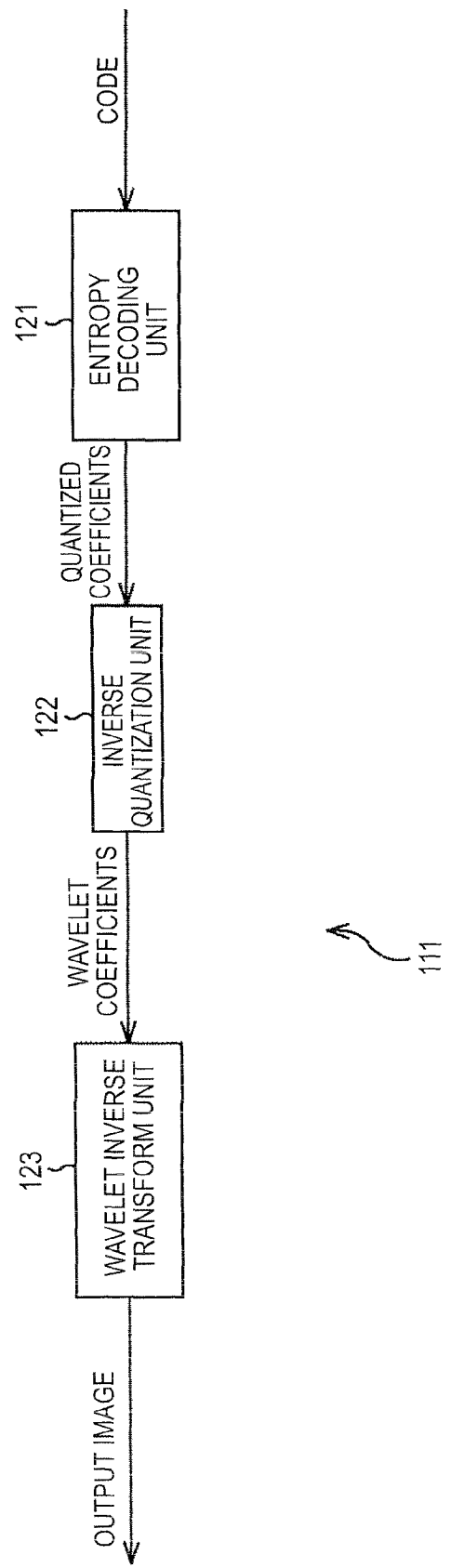
FIG. 16 is a block diagram showing a main configuration example of an image decoding apparatus.

FIG. 16 is a block diagram showing a main configuration example of an image decoding apparatus. An image decoding apparatus 111 shown in FIG. 16 is an image processing apparatus corresponding to the image coding apparatus 11. That is, the image decoding apparatus 111 decodes encoded data outputted by encoding image data inputted to the image coding apparatus 11 by a method corresponding to coding processing of the image coding apparatus 11, outputting decoded image data.

As shown in FIG. 16, the image decoding apparatus 111 includes an entropy decoding unit 121, an inverse quantization unit 122 and a wavelet inverse transform unit 123.

An encoded image (data) is inputted to the entropy decoding unit 121. The entropy decoding unit 121 performs entropy decoding to the inputted code as the encoded image, supplying quantized coefficients obtained by the decoding to the inverse quantization unit 122.

The inverse quantization unit 122 performs inverse quantization to the quantized coefficients supplied from the entropy decoding unit 121, supplying wavelet coefficients of each sub-band obtained by the inverse quantization to the wavelet inverse transform unit 123.

The wavelet inverse transform unit 123 performs wavelet inverse transform to wavelet coefficients of each sub-band, which has been supplied from the inverse quantization unit 122, outputting the image obtained as the result of the wavelet inverse transform as the decoded image.

[Entropy Decoding Unit]

Figure 17:
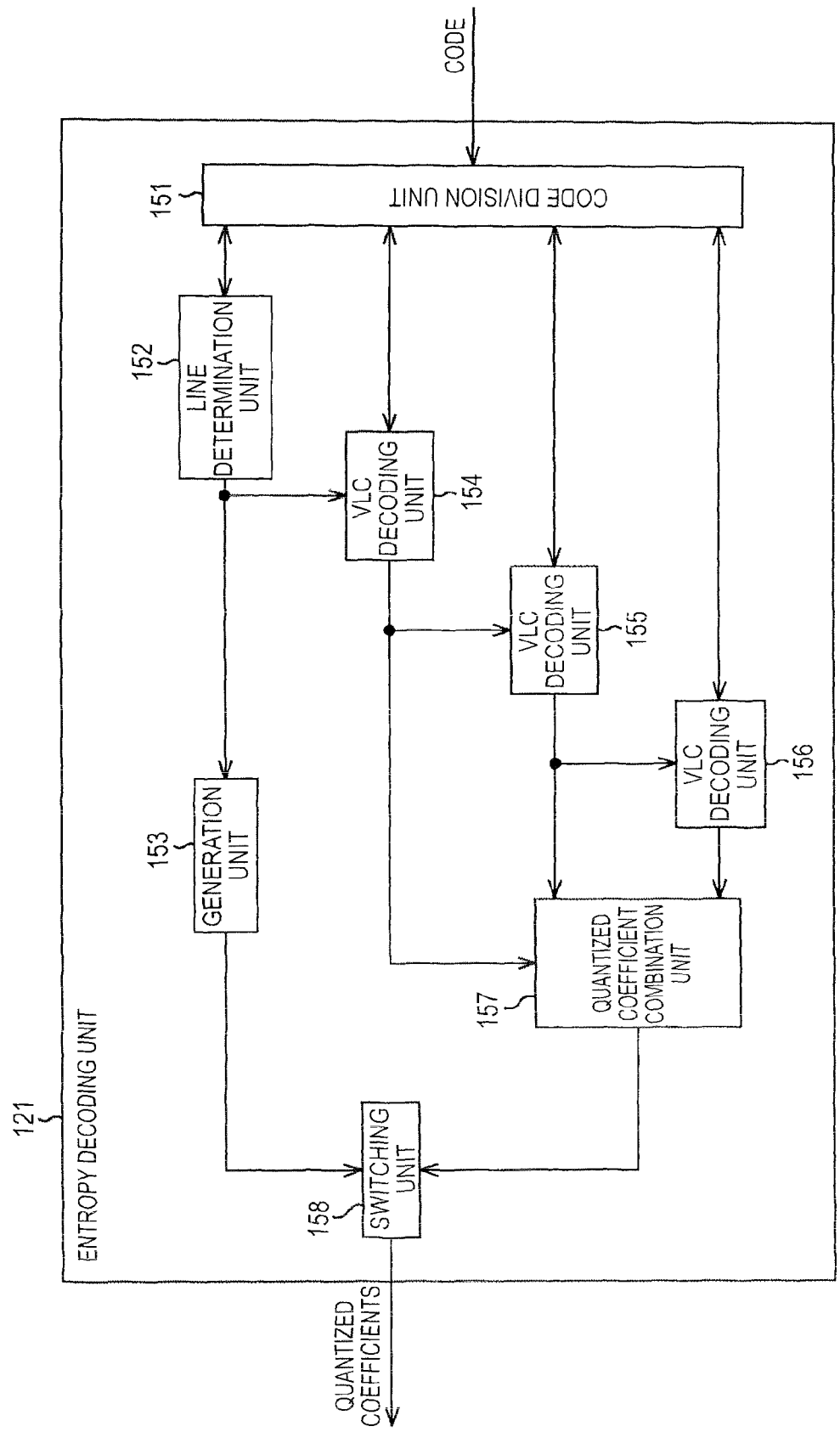
FIG. 17 is a block diagram showing a main configuration example of an entropy decoding unit.

FIG. 17 is a block diagram showing a main configuration example of the entropy decoding unit 121.

As shown in FIG. 17, the entropy decoding unit 121 includes a code division unit 151, a line determination unit 152, a generation unit 153, a VLC decoding unit 154, a VLC decoding unit 155, a VLC decoding unit 156, a quantized coefficient combination unit 157 and a switching unit 158.

The code division unit 151 divides the inputted code as the encoded image based on information supplied from the line determination unit 152, the VLC decoding unit 154, the VLC decoding unit 155 and the VLC decoding unit 156, supplying divided codes having given lengths to the line determination unit 152, the VLC decoding unit 154, the VLC decoding unit 155 or the VLC decoding unit 156.

That is, the code division unit 151 divides the inputted code into a code indicating whether encoded quantized coefficients in one line are all "0" or not, a code indicating the encoded maximum number of significant digits of W-pieces quantized coefficients, a code indicating zero-run, a code indicating encoded absolute values of W-pieces quantized coefficients and a code indicating encoded signs of the quantized coefficients, supplying respective codes to processing units corresponding to respective data in the line determination unit 152, the VLC decoding unit 154, the VLC decoding unit 155 and the VLC decoding unit 156.

More specifically, the code division unit 151 supplies the code indicating whether encoded quantized coefficients in one line are all "0" or not to the line determination unit 152. The code division unit 151 supplies the code indicating the encoded maximum number of significant digits of W-pieces quantized coefficients to the VLC decoding unit 154. The code division unit 151 further supplies the code indicating zero-run to the VLC decoding unit 154. The code division unit 151 also supplies the code indicating encoded absolute values of W-pieces quantized coefficients to the VLC decoding unit 155. Furthermore, the code division unit 151 also supplies the code indicating encoded signs of the quantized coefficients to the VLC decoding unit 156.

The line determination unit 152 determines whether encoded quantized coefficients in one line of a sub-band are all "0" or not based on the code supplied from the code division unit 151, supplying information indicating the determination result to the code division unit 151, the generation unit 153 and the VLC decoding unit 154.

The generation unit 153 generates a code indicating quantized coefficients values of which are "0" in one line based on information indicating the determination result from the line determination unit 152 and supplies the code to the switching unit 158.

The VLC decoding unit 154 decodes the code indicating the encoded maximum number of significant digits of the W-pieces quantized coefficients supplied from the code division unit 151 and calculates the encoded maximum number of significant digits of the W-pieces quantized coefficients, then, supplies information indicating the calculated maximum number of significant digits to the code division unit 151, the VLC decoding unit 155 and the quantized coefficient combination unit 157.

The VLC decoding unit 154 decodes the code indicating zero-run supplied from the code division unit 151 and generates a group of quantized coefficients forming zero-run. The VLC decoding unit 154 supplies the group of quantized coefficients obtained by decoding to the code division unit 151, the VLC decoding unit 155 and the quantized coefficient combination unit 157.

The VLC decoding unit 155 decodes the code indicating absolute values of quantized coefficients supplied from the code division unit 151 based on information indicating the maximum number of significant digits from the VLC decoding unit 154, supplying (data) of significant digits of W-pieces quantized coefficients to the VLC decoding unit 156 and the quantized coefficient combination unit 157. The VLC decoding unit 155 supplies information indicating the decoded result of the code indicating absolute values of quantized coefficients to the code division unit 151.

The VLC decoding unit 156 decodes the code indicating signs of quantized coefficients supplied from the code division unit 151 based on the significant digits of quantized coefficients supplied from the VLC decoding unit 155, supplying (data) of signs of quantized coefficients obtained by the decoding to the quantized coefficient combination unit 157. The VLC decoding unit 156 also supplies information indicating the decoded result of the code indicating signs of quantized coefficients to the code division unit 151.

The quantized coefficient combination unit 157 combines the significant digits of quantized coefficients supplied from the VLC decoding unit 155 and signs of quantized coefficients supplied from the VLC decoding unit 156 based on information indicating the maximum number of significant digits from the VLC decoding unit 154, supplying W-pieces quantized coefficients obtained by the combination to the switching unit 158.

The quantized coefficient combination unit 157 supplies the group of quantized coefficients with the "0" forming zero-run supplied from the VLC decoding unit 154 to the switching unit 158.

The switching unit 158 outputs quantized coefficients from the generation unit 153 or the coefficient combination unit 157.

[Code Division Unit]

Figure 18:
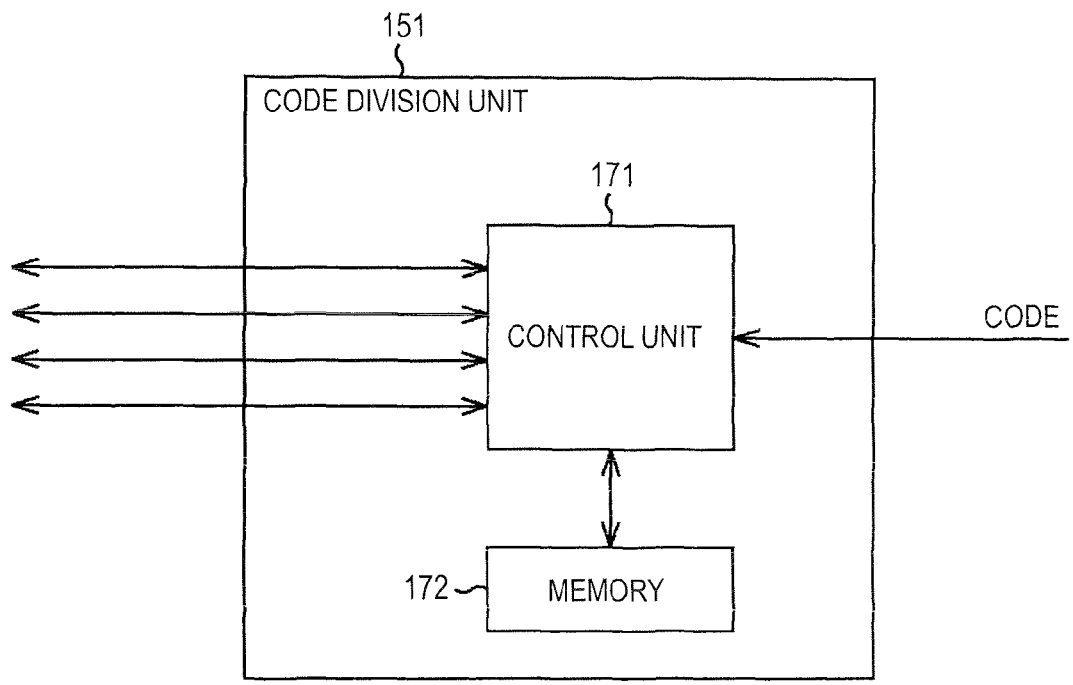
FIG. 18 is a block diagram showing a configuration example of a code division unit.

FIG. 18 is a block diagram showing a main configuration example of the code division unit 151. As shown in FIG. 18, the code division unit 151 includes a control unit 171 and a memory 172.

The control unit 171 reads out codes with given lengths in codes temporarily stored in the memory 172 based on information respectively supplied from the line determination unit 152, the VLC decoding unit 154, the VLC decoding unit 155 and the VLC decoding unit 156 shown in FIG. 17, supplying the code to the line determination unit 152, the VLC decoding unit 154, the VLC decoding unit 155 or the VLC decoding unit 156.

Figure 19:
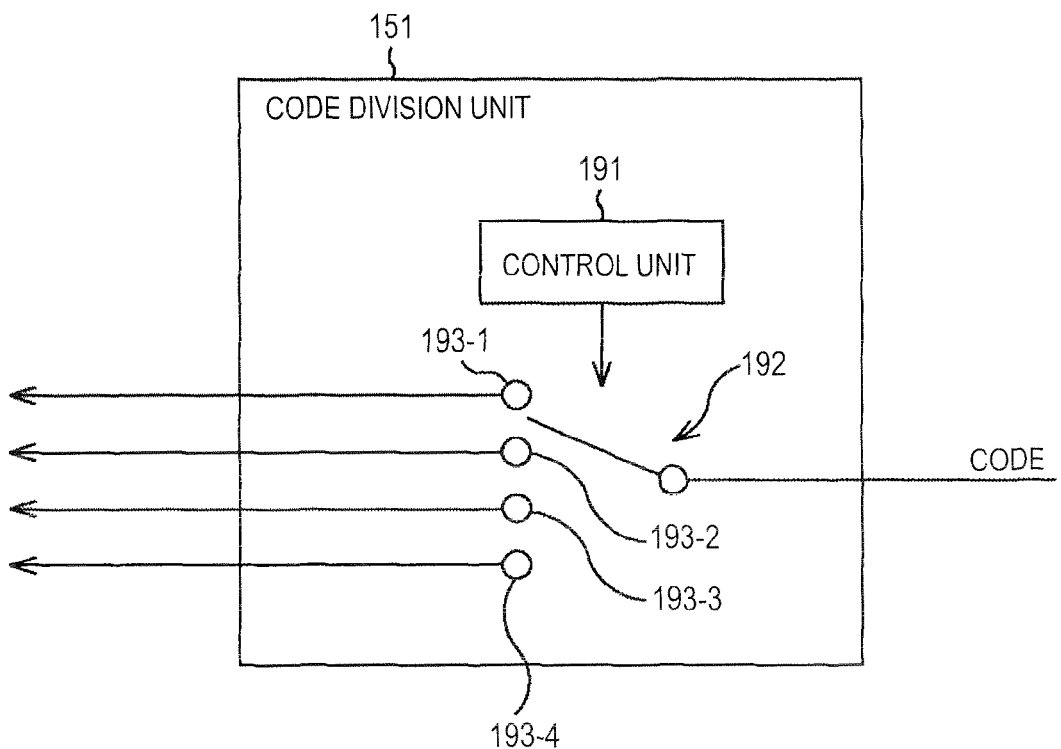
FIG. 19 is a block diagram showing another configuration example of the code division unit.

The code division unit 151 may have a configuration, for example, shown in FIG. 19, in addition to the configuration example shown in FIG. 18.

The code division unit 151 shown in FIG. 19 includes a control unit 191, a switch 192 and nodes 193-1 to 193-4.

When the code as the encoded image is inputted to the code division unit 151, the control unit 191 controls the switch 192 to supply the code with the given length in the inputted codes to the line determination unit 152, the VLC decoding unit 154, the VLC decoding unit 155 or the VLC decoding unit 156 based on information respectively supplied from the line determination unit 152, the VLC decoding unit 154, the VLC decoding unit 155 and the VLC decoding unit 156 shown in FIG. 17.

That is, respective nodes 193-1 to 193-4 are connected to the line determination unit 152, the VLC decoding unit 154, the VLC decoding unit 155 and the VLC decoding unit 156 respectively. The control unit 191 selects any of the nodes 193-1 to 193-4 as a supply destination of the code and controls the connection between the switch 192 and the selected node.

The switch 192 connects the selected node to the input based on control of the control unit 191, the code inputted to the code division unit 151 is supplied to the line determination unit 152, the VLC decoding unit 154, the VLC decoding unit 155 or the VLC decoding unit 156 selected as the supply destination of the code through the switch 192 and the node connected to the switch 192.

[VLC Decoding Unit]

Figure 20:
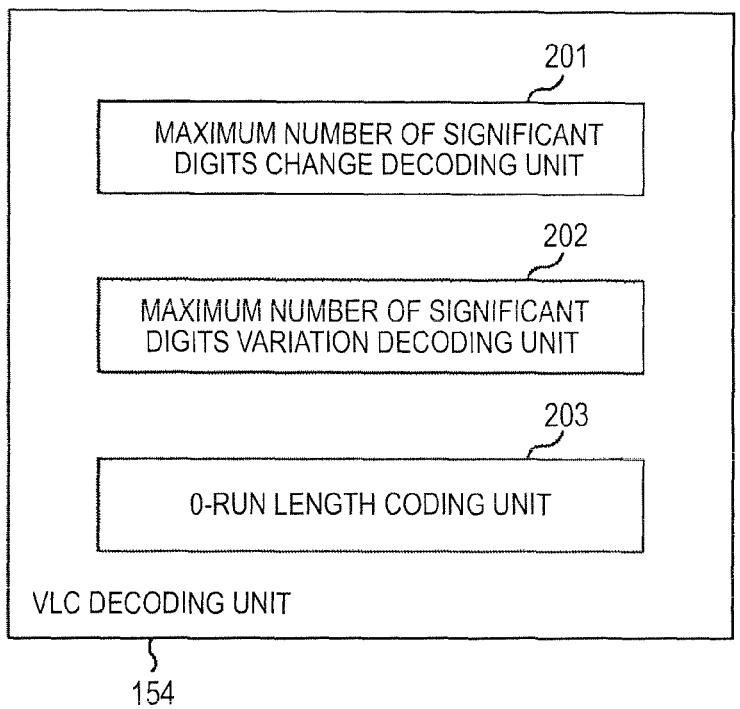
FIG. 20 is a block diagram showing a main configuration of a VLC decoding unit.

FIG. 20 is a block diagram showing a main configuration example of the VLC decoding unit 154.

As shown in FIG. 20, the VLC decoding unit 154 includes a maximum number of significant digits change decoding unit 201, a maximum number of significant digits variation decoding unit 202 and a 0-run length decoding unit 203.

The maximum number of significant digits change decoding unit 201 decodes a code indicating change of the maximum number of significant digits included in the code indicating the maximum number of significant digits, which is supplied from the code division unit 151.

The maximum number of significant digits variation decoding unit 202 decodes a code indicating a variation of the maximum number of significant digits included in the code indicating the maximum number of significant digits, which is supplied from the code division unit 151.

The VLC decoding unit 154 supplies information obtained by the decoding to the VLC decoding unit 155 or the quantized coefficient combination unit 157.

The 0-run length decoding unit 203 decodes the code indicating zero-run, which is supplied from the code division unit 151, generating the group of quantized coefficients forming zero-run. The VLC decoding unit 154 supplies the generated group of quantized coefficients to the VLC decoding unit 155 and the quantized coefficient combination unit 157.

[Flow of Decoding Processing]

Next, decoding processing by the image decoding apparatus 111 will be explained with reference to a flowchart of FIG. 21. The decoding processing is started when the code as the encoded image is inputted to the entropy decoding unit 121.

In Step S131, the entropy decoding unit 121 performs entropy decoding to the code as the inputted image by performing entropy decoding processing, supplying the quantized coefficients obtained by the decoding to the inverse quantization unit 122.

Though the details of entropy decoding processing is described later, the entropy decoding unit 121 decodes quantized coefficients at successive positions on the line of the encoded sub-band in units of W-pieces coefficients in the entropy decoding processing, supplying the decoded quantized coefficients to the inverse quantization unit 122. In the entropy decoding processing, the entropy decoding unit 121 decodes the code indicating zero-run including quantized coefficients values of which are "0", thereby decoding the group of quantized coefficients values of which are "0" forming zero-run in a lot.

In Step S132, the inverse quantization unit 122 performs inverse quantization to quantized coefficients supplied from the entropy decoding unit 121, supplying the wavelet coefficients of each sub-band obtained by inverse quantization to the wavelet inverse transform unit 123.

In Step S133, the wavelet inverse transform unit 123 performs wavelet inverse transform to wavelet coefficients of each sub-band, which have been supplied from the inverse quantization unit 122, outputting the image obtained as the result of the transformation to end the decoding processing.

As described above, the image decoding apparatus 111 decodes and outputs the encoded image.

[Flow of Entropy Decoding Processing]

Next, entropy decoding processing corresponding to the process of Step S131 of FIG. 21 will be explained with reference to a flowchart of FIG. 22.

In Step S161, the line determination unit 152 stores a variable "y" indicating the line of the sub-band to be decoded from now as y=0.

In Step S162, the VLC decoding unit 154 stores a variable Binit indicating the maximum number of significant digits of W-pieces quantized coefficients to be first inputted on a line (y−1) one line previous to the line "y" indicated by the variable "y" stored in the line determination unit 152 as Binit=0.

For example, when the line (y−1) is the line L1 shown in FIG. 2, a value of the variable "y" indicating the maximum number of significant digits of W-pieces quantized coefficients to be first inputted on the line (y−1) will be the maximum number of significant digits of W-pieces quantized coefficients positioned from the left end to the W-th coefficient. When the variable "y" stored by the line determination unit 152 is y=0, the line (y−1) does not exist, therefore, the value of the variable Binit will be Binit=0.

In Step S163, the code division unit 151 supplies a code of the first one bit in the inputted codes as the code indicating whether quantized coefficients in the line to be decoded from now are all "0" or not to the line determination unit 152.

Also in Step S163, the line determination unit 152 determines whether the one-bit code read (supplied) from the code division unit 151 is "0" or not, generating information indicating the determination result to be supplied to the generation unit 153, the VLC decoding unit 154 and the code division unit 151. When it is determined that the code is "0", the quantized coefficients in the line "y" are all "0", therefore, the line determination unit 152 allows the process to proceed to Step S164.

In Step S164, the generation unit 153 sets all quantized coefficients in the line "y" to "0" based on information indicating the determination result from the line determination unit 152. Then, the generation unit 153 generates the code indicating the quantized coefficients in the line "y" and supplies the code to the switching unit 158.

For example, in the case where one quantized coefficient is represented in four digits and quantized coefficients in one line are five, the generation unit 153 generates 20 (=4×5) pieces "0"s as the code indicating quantized coefficients in the line "y" to be supplied to the switching unit 158. The switching unit 158 outputs successive 20-pieces of "0"s supplied from the generation unit 153 to the inverse quantization unit 122 as the code indicating quantized coefficients in one line.

In Step S165, the VLC decoding unit 154 sets the value of the stored variable Binit to Binit=0 and updates the variable Binit based on information indicating the determination result from the line determination unit 152.

In Step S166, the line determination unit 152 determines whether there is an unprocessed line or not in lines of the sub-band during decoding. That is, the line determination unit 152 determines whether quantized coefficients at positions on all lines of the sub-band during decoding have been decoded or not.

In Step S166, when it is determined that there is an unprocessed line, the line determination unit 152 allows the process to proceed to Step S167 for decoding quantized coefficients at respective positions on a line (y+1) subsequent to the line "y" indicated by the variable "y" stored in the line determination unit 152.

In Step S167, the line determination unit 152 increments the variable "y" indicating the stored line to be y=y+1, returns the processing to Step S163 and allows subsequent processes to be executed.

Figure 21:
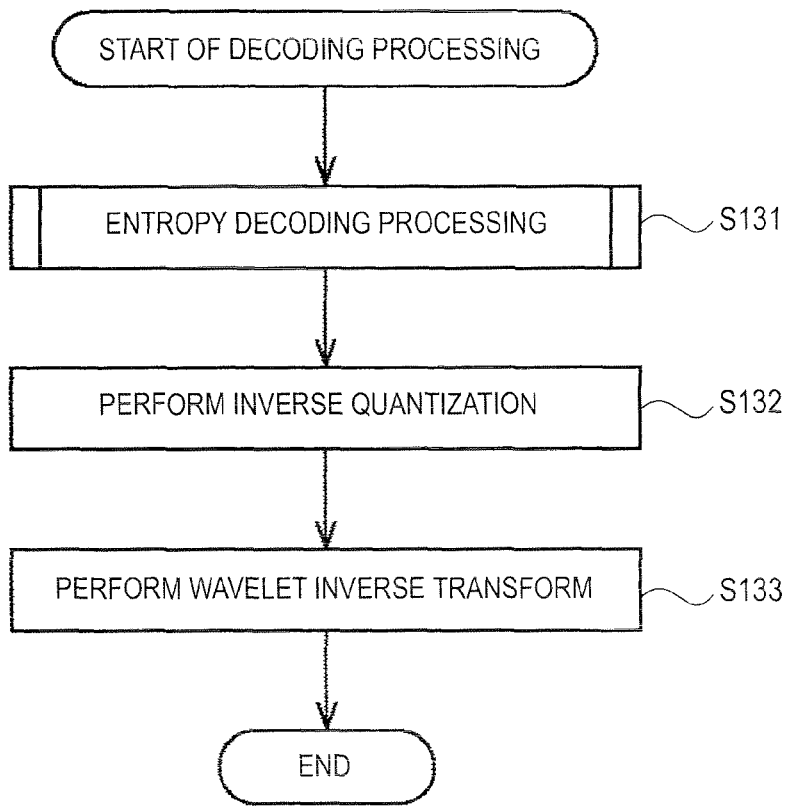
FIG. 21 is a flowchart for explaining an example of the flow of decoding processing.

On the other hand, when it is determined that there of no unprocessed line in Step S166, the line determination unit 152 ends the entropy decoding processing as quantized coefficients in all lines included in the sub-band have been decoded, returning the process to Step S131 of FIG. 21 and allowing processes after Step S132 to be executed.

Figure 22:
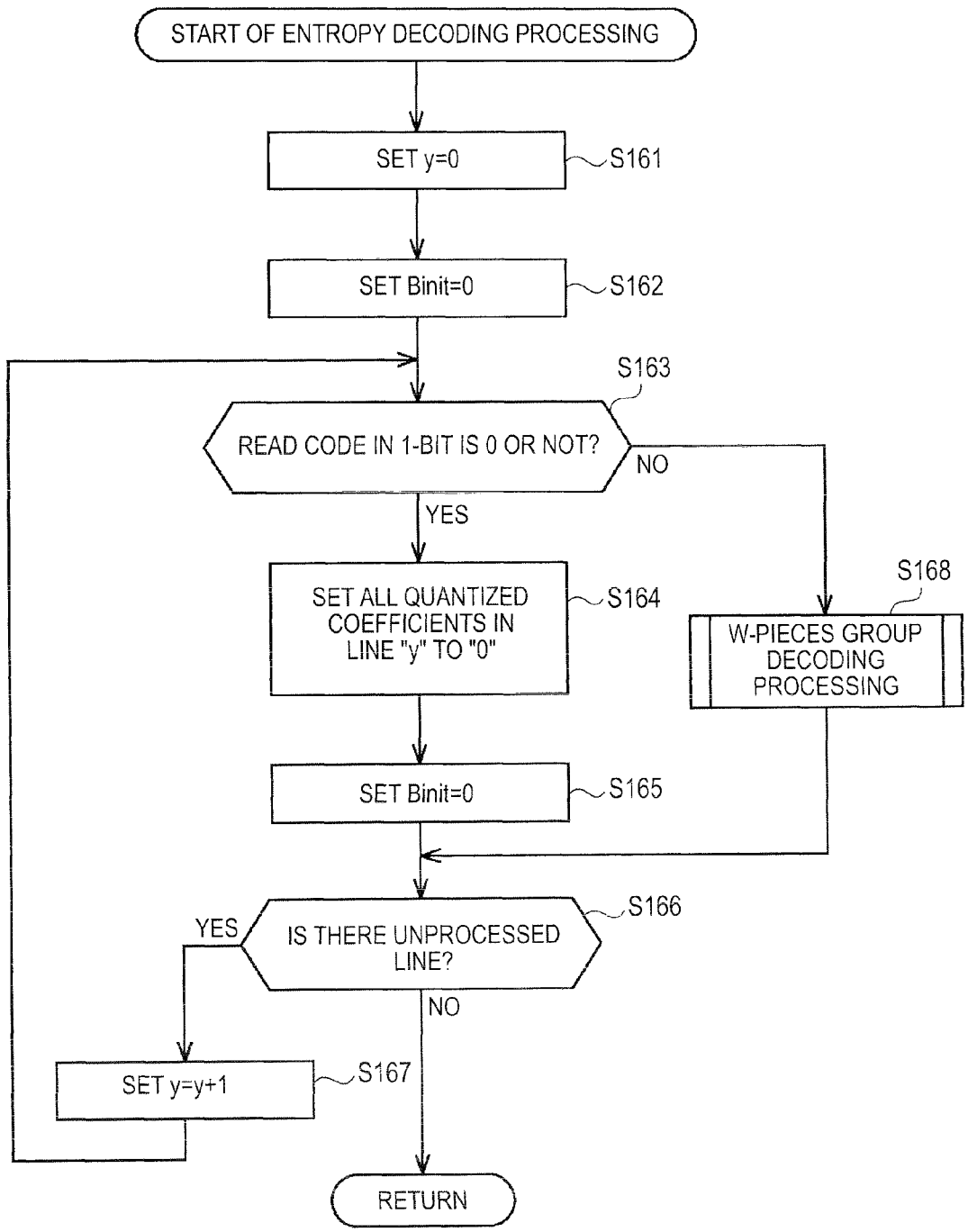
FIG. 22 is a flowchart for explaining an example of the flow of entropy decoding processing.

When it is determined that the code is not "0" in Step S163 of FIG. 22, the line determination unit 152 allows the process to proceed to Step S168. In Step S168, the entropy decoding unit 121 performs W-pieces group decoding processing.

Though the details of the W-pieces group decoding processing will be described later, the entropy decoding unit 121 decodes quantized coefficients at successive W-pieces positions on the line "y" indicated by the variable "y" stored in the line determination unit 152 in the W-pieces group decoding processing.

The entropy decoding unit 121 decodes the group of quantized coefficients values of which are "0" forming zero-run in a lot by decoding the code indicating zero-run including quantized coefficients values of which are "0" in the W-pieces group decoding processing.

When the W-pieces group decoding processing ends, the entropy decoding unit 121 returns the process to Step S166 and allows subsequent processes to be executed.

As described above, the entropy decoding unit 121 decodes quantized coefficients at respective positions in the sub-band in units of predetermined number of coefficients in Raster scan order.

It is possible to process the encoded quantized coefficients in the inputted order by decoding the quantized coefficients at respective positions of the sub-band in units of predetermined number of coefficients in Raster scan order, which can reduce delay occurring due to the decoding of quantized coefficients.

[Flow of W-pieces Group Decoding Processing]

Next, an example of the flow of the W-pieces group decoding processing executed in Step S168 of FIG. 22 will be explained with reference to a flowchart of FIG. 23 and FIG. 24.

In Step S201, the entropy decoding unit 121 initializes various types of variables such as the variables "i", "B", "max" and so on. For example, the entropy decoding unit 121 sets the variable "i" to "0", sets the variable "B" to "0" and sets a value of the variable "max" to the number of W-pieces groups of coefficients. For example, the 0-run length decoding unit 203 sets initial values of all coefficients to "0".

As described above, the one-bit code indicating whether the maximum number of significant digits of W-pieces quantized coefficients to be decoded from now has been changed or not is supplied from the code division unit 151 to the VLC decoding unit 154 in Step S168 of FIG. 22.

In Step S202, the change decoding unit of the maximum number of significant digits 201 reads the one-bit code (acquires the one-bit code from the code division unit 151) as the code indicating whether the maximum number of significant digits has been changed or not. The maximum number of significant digits change decoding unit 201 determines whether the read one-bit code is "0" or not and generates information indicating that the maximum number of significant digits has not been changed when determined to be "0" as the maximum number of significant digits has not been changed, then, supplies the information to the code division unit 151, the VLC decoding unit 155 and the quantized coefficient combination unit 157. After that, the maximum number of significant digits change decoding unit 201 omits (skips) respective processes from Step S203 to Step S207 and allows the process to proceed to Step S208.

That is, when the code indicating whether the maximum number of significant digits has been changed or not is "0", the code indicating that the maximum number of significant digits has been increased/reduced or the code indicating a variation of the maximum number of significant digits are not transmitted. Therefore, respective processes from Step S203 to Step S207 which are the processes of decoding the code indicating whether the maximum number of significant digits has been increased/reduced and the code indicating the variation of the maximum number of significant digits are omitted (skipped).

On the other hand, when it is determined that the read one-bit code is not "0" in Step S202, the maximum number of significant digits change decoding unit 201 allows the process to proceed to Step S203 as the maximum number of significant digits has been changed.

In Step S203, the maximum number of significant digits change decoding unit 201 reads one-bit code (acquires the one-bit code from the code division unit 151) as the code indicating whether the maximum number of significant digits has been increased or reduced. The maximum number of significant digits change decoding unit 201 determines whether the read one-bit code is "0" or not, and allows the process to proceed to Step S204 when determined to be "0".

When the one-bit code is "0", the maximum number of significant digits has been reduced from the previous group. Accordingly, the maximum number of significant digits variation decoding unit 202 reads codes until the code "1" comes or until reaching the maximum (B−1) bit in Step S204. That is, the maximum number of significant digits variation decoding unit 202 continues reading codes while the read codes are "0", and completes reading of codes when the code "1" is read. The maximum number of significant digits variation decoding unit 202 ends the reading of the codes "0" when the code "1" is not read and the bit number of the read codes "0" reaches (B−1) bits ((B−1) bits of codes continue).

The maximum number of significant digits variation decoding unit 202 sets the number of codes "0" read until then to "n".

In Step S205, the maximum number of significant digits variation decoding unit 202 updates the maximum number of significant digits B as shown in the following expression (1) by using the number "n" of the read codes "0".

$$B=B-(n+1) \quad (1)$$

After updating the maximum number of significant digits B, the maximum number of significant digits variation decoding unit 202 allows the process to proceed to Step S208.

When it is determined that the read one-bit code is not "0" in Step S203, the process proceeds to Step S206.

In Step S206, the maximum number of significant digits variation decoding unit 202 reads codes until the code "1" is acquired in Step S204. That is, the maximum number of significant digits variation decoding unit 202 continues reading codes while the read codes are "0", and completes reading of codes when the code "1" is read.

The maximum number of significant digits variation decoding unit 202 sets the number of codes "0" until then to "n".

In Step S207, the maximum number of significant digits variation decoding unit 202 updates the maximum number of significant digits B as shown in the following expression (2) by using the number "n" of the read codes "0".

$$B=B+(n+1) \quad (2)$$

After updating the maximum number of significant digits B, the maximum number of significant digits variation decoding unit 202 allows the process to proceed to Step S208.

The maximum number of significant digits change decoding unit 201 determines whether B≠0 or not in Step S208. When it is determined that B≠0, the maximum number of significant digits change decoding unit 201 allows the process to proceed to Step S209.

In Step S209, the VLC decoding unit 155 reads B-bits of codes concerning respective quantized coefficients in the i-th W-pieces group of coefficients (namely, the group to be processed), setting values to absolute values of quantized coefficients.

In Step S210, the VLC decoding unit 156 reads one-bit of each code concerning coefficients in which the absolute values calculated in Step S209 are not "0" in respective quantized coefficients of the i-th W-pieces group of coefficients (namely, the group to be processed), setting the values to signs of the quantized coefficients.

The quantized coefficient combination unit 157 combines the absolute values generated in Step S209 with the signs generated in Step S210 to thereby generate four-digit quantized coefficients with signs. The quantized coefficient combination unit 157 supplies the quantized coefficients with signs to the switching unit 158.

The entropy decoding unit 121 determines whether the variable "i" is lower than "max−1" or not in Step S211. That is, the entropy decoding unit 121 determines whether the all groups of quantized coefficients in the line to be processed have been processed or not.

When it is determined that the variable "i" is lower than "max−1" and that an unprocessed group exists in the line to be processed, the entropy decoding unit 121 allows the process to proceed to Step S212. In Step S212, the entropy decoding unit 121 increments the variable "i" (variable i=i+1) and returns the processing to Step S202.

On the other hand, when it is determined that the variable "i" is not lower than "max−1" and that there is no unprocessed group in the line to be processed, the entropy decoding unit 121 allows the process to proceed to Step S213.

In Step S213, the switching unit 158 outputs quantized coefficients of one line (quantized coefficients with signs and quantized coefficients values of which are "0") supplied from the quantized coefficient combination unit 157 to the inverse quantization unit 122.

When the process of the Step S213 ends, the switching unit 158 ends the W-pieces group decoding processing and returns the process to Step S166 of FIG. 22.

Figure 24:
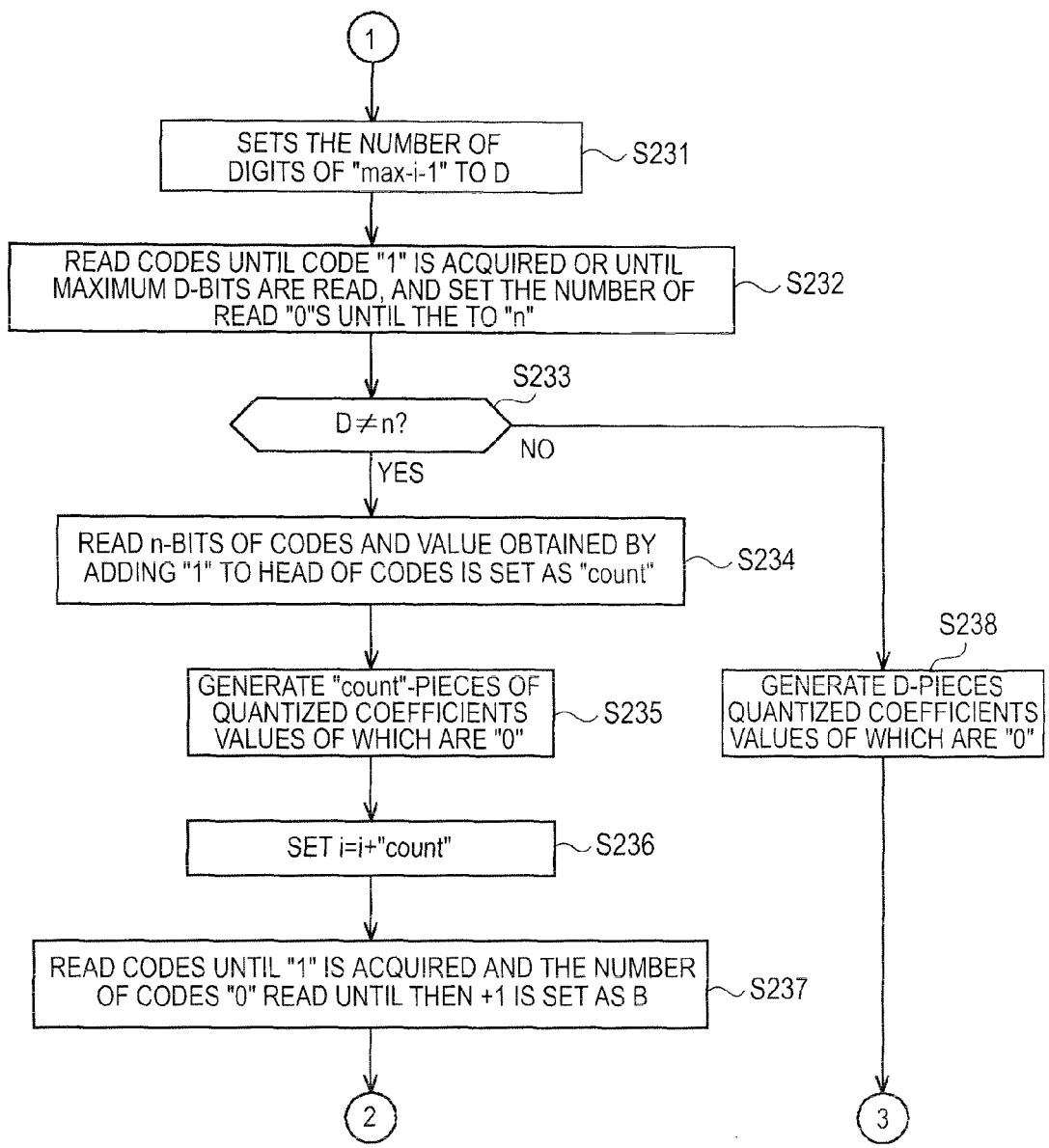
FIG. 24 is a flowchart continued from FIG. 22 explaining the example of the flow of W-pieces group decoding processing.

In Step S208, it is determined that B≠0 is denied, the maximum number of significant digits change decoding unit 201 allows the process to proceed to Step S231 of FIG. 24.

In Step S231 of FIG. 24, the 0-run length decoding unit 203 sets the number of digits of "max−i−1" to D.

In Step S232, the 0-run length decoding unit 203 starts reading of codes (acquiring codes from the code division unit 151), and continues reading (first reading) of codes until the code "1" is acquired or until the maximum D-bits of codes "0" are read.

In the first reading, a portion of a code string on the left side of a comma shown in the rightmost column of the table of FIG. 5 is read, or a code string in the third column from the left of the table of FIG. 7 or FIG. 9 is read.

The 0-run length decoding unit 203 sets the number of the read codes "0" to "n".

In Step S233, the 0-run length decoding unit 203 determines whether D≠n or not. When it is determined that the D≠n, namely, when it is determined that zero-run does not reach the end of the line, the 0-run length decoding unit 203 allows the process to proceed to Step S234.

That is, in this case, the portion of the code string on the left side of the comma shown in the rightmost column of the table of FIG. 5 is read in the first reading. It is found, from the first reading, that a portion from the comma to the n-th code correspond to a portion on the right side of the comma (that the code indicating zero-run has n-bits) in the first reading.

Accordingly, the 0-run length decoding unit 203 reads n-bits of codes (second reading) in Step S234. A code string obtained by adding the code "1" to the head of the read n-bits of codes is substituted into the variable "count". That is, codes in binary expression in the second column from the left in the table of FIG. 5 are substituted into the variable "count".

In Step S235, the 0-run length decoding unit 203 generates "count"-pieces (binary expression) of quantized coefficients values of which are "0", outputting the coefficients to the quantized coefficient combination unit 157. For example, explaining with reference to the table of FIG. 5, four-pieces quantized coefficients values of which are "0" are generated in the case of the variable "count"=100.

The quantized coefficient combination unit 157 supplies the "count"-pieces quantized coefficients values of which are "0" (quantized coefficients forming zero-run) to the switching unit 158.

In Step S236, the 0-run length decoding unit 203 updates the variable "i" by using the variable "count" as shown in the following expression (3). That is, the 0-run length decoding unit 203 moves the group to be processed to the next group of zero-run.

$$i = i + \text{count} \tag{3}$$

In Step S237, the maximum number of significant digits variation decoding unit 202 starts reading of codes (acquiring codes from the code division unit 151) and continues reading of codes until acquiring the code "1". Then, when the code "1" is acquired, the maximum number of significant digits variation decoding unit 202 sets a value obtained by adding "1" to the number of codes "0" read until then as the maximum number of significant digits B. The maximum number of significant digits variation decoding unit 202 supplies the updated maximum number of significant digits B to the VLC decoding unit 155 and the quantized coefficient combination unit 157.

That is, in Step S237, decoding of the maximum number of significant digits B with respect to the group of quantized coefficients next to the group of zero-run. In this case, the previous group is the group of quantized coefficients forming zero-run and B=0, the code "1" indicating that "changed (diff)" or the code "0" indicating that "increase B (plus)" is omitted.

When the process of Step S237 ends, the maximum number of significant digits variation decoding unit 202 returns the process to Step S209 and allows subsequent processes to be executed. That is, absolute values and signs of quantized coefficients in the group of quantized coefficients next to the group of zero-run are decoded.

When it is determined that D=n in Step S233 of FIG. 24, namely, when it is determined that zero-one reaches the last of the line, the 0-run length decoding unit 203 allows the process to proceed to Step S238.

That is, the code string in the third column from the left of the table of FIG. 7 or FIG. 9 is read by the first reading in this case.

Accordingly, the 0-run length decoding unit 203 generates D-pieces quantized coefficients values of which are "0" and outputs the coefficients to the quantized coefficient combination unit 157 in Step S238. The quantized coefficient combination unit 157 supplies the D-pieces quantized coefficients values of which are "0" (quantized coefficients forming zero-run) to the switching unit 158.

Figure 23:
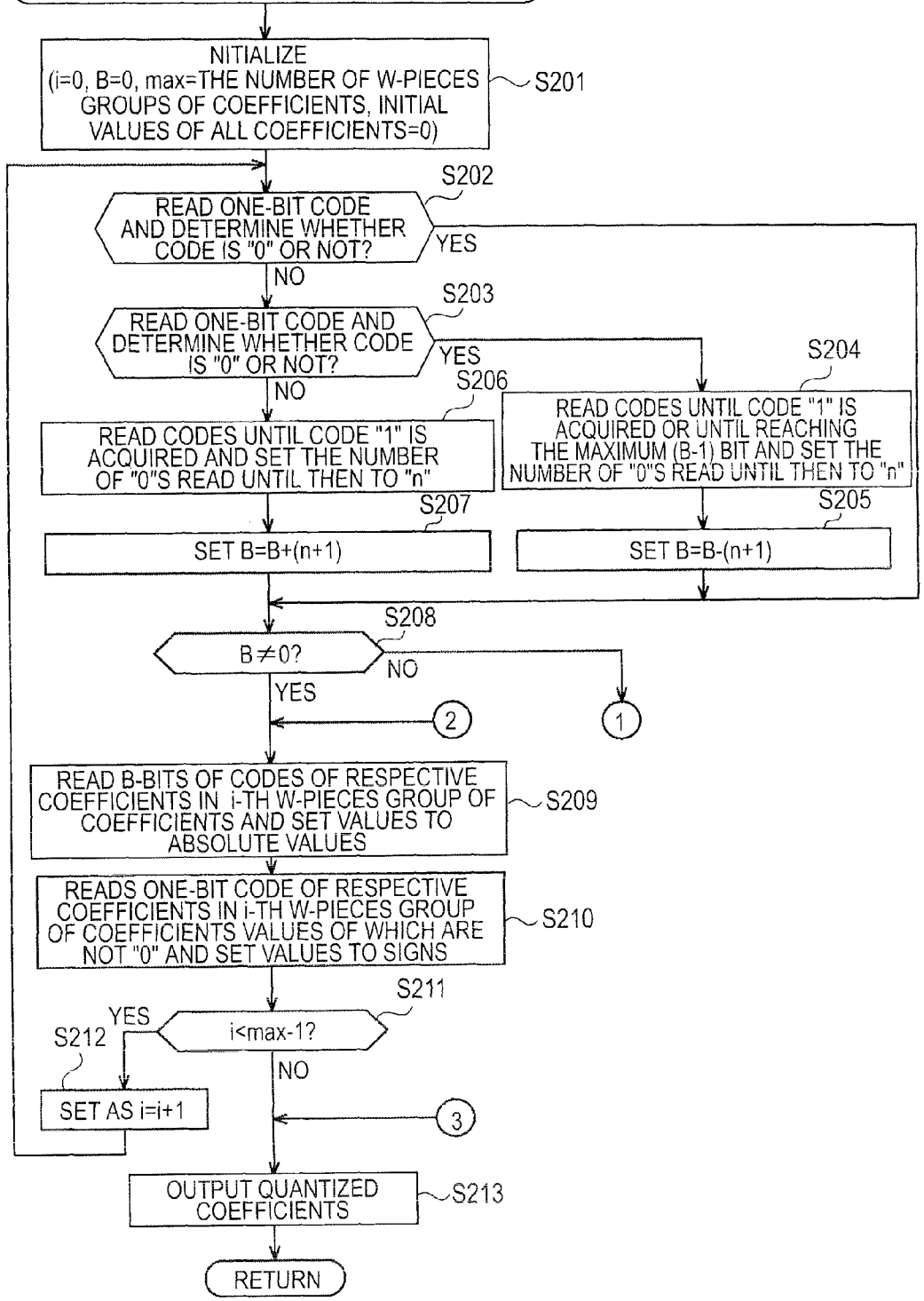
FIG. 23 is a flowchart for explaining an example of the flow of W-pieces group decoding processing.

When the process of Step S238 ends, the 0-run length decoding unit 203 returns the process to Step S213 of FIG. 23 and allows subsequent processes to be executed. That is, quantized coefficients values of which are "0" are supplied to the inverse quantization unit 122.

As described above, the entropy decoding unit 121 decodes quantized coefficients in the encoded sub-band in units of predetermined number of coefficients as a group.

As the quantized coefficients in the encoded sub-band are decoded in units of predetermined number of coefficients as a group, it is not necessary to perform plural processing with respect to each bit plane based on plural coding passes, which differs from, for example, the case where the image is decoded by using the JPEG 2000 method, therefore, it is possible to decode images more speedily. As a result, it is possible to realize a decoding apparatus for decoding high-resolution images in real time.

When respective processes are executed as described above, the image decoding apparatus 111 can accurately decode the code in which zero-run is encoded in a lot to restore quantized coefficients values of which are "0". Therefore, the image decoding apparatus 111 can realize reduction in the code amount of zero-run and can realize improvement in efficiency of encoding coefficient data with many zeros.

In the image coding apparatus 11 explained as the above, the explanation has been made so that absolute values of the predetermined W-pieces absolute values are sequentially encoded in the case where absolute values of quantized coefficients are encoded (or decoded), however, it is possible to encode (decode) images more speedily when W-pieces quantized coefficients are encoded (or decoded) simultaneously (in parallel) by using a general-purpose DSP (Digital Signal Processor) or SIMD (Single Instruction Multiple Data) operation instructions used in a general-purpose CPU.

Additionally, the explanation has been made so that the code indicating whether the quantized coefficients in the line to be processed are all "0" or not is generated by the image coding apparatus 11 and decoded by the image decoding apparatus 111 in the first embodiment and the second embodiment, however, the code can be omitted.

In the above case, the line determination unit 61 and the VLC coding unit 62 in the entropy coding unit 23 of FIG. 10 can be omitted in the image coding apparatus 11. Additionally, the processes in Step S43 to Step S45 and Step S46 of FIG. 13 are omitted, the process in Step S49 is executed after the process in Step S42, then, the process in Step S46 is executed. After the process in Step S47 ends, the process is returned to Step S49.

In the image decoding apparatus 111, the line determination unit 152 and the generation unit 153 in the entropy decoding unit 121 of FIG. 17 can be omitted. Additionally, the processes in Step S163 to S165 of FIG. 22 are omitted, the process in Step S168 is executed after the process of Step S162, then, the process in Step S166 is executed. After the process in Step S167 ends, the process is returned to Step S168.

According to the above, it is possible to reduce the code amount for one bit when values of quantized coefficients in the line to be processed are not all "0". Also when values of quantized coefficients in the line to be processed are all "0", the code amount can be sufficiently reduced by encoding zero-run in a lot as described above.

Data to be encoded by the entropy coding unit 23 can be data other than quantized coefficients. For example, it is possible that the quantization unit 22 is omitted in the image encoding apparatus 11 and the entropy coding unit 23 encodes wavelet coefficients outputted from the wavelet transform unit 21. In this case, the entropy decoding unit 121 decodes the inputted encoded data and outputs wavelet coefficients. Therefore, the inverse quantization unit 122 can be omitted in the image decoding apparatus 111 in this case. The entropy decoding unit 121 decodes the inputted encoded data and outputs image data. Therefore, the wavelet inverse transform unit 123 can be also omitted in the image decoding apparatus 111 in this case.

It is also possible that the wavelet transform unit 21 is also omitted and the entropy coding unit 23 encodes image data (inputted images). Also in this case, the entropy decoding unit 121 decodes the inputted encoded data and outputs data corresponding to data encoded by the entropy coding unit 23.

3. Third Embodiment

[Image Coding Apparatus]

Figure 25:
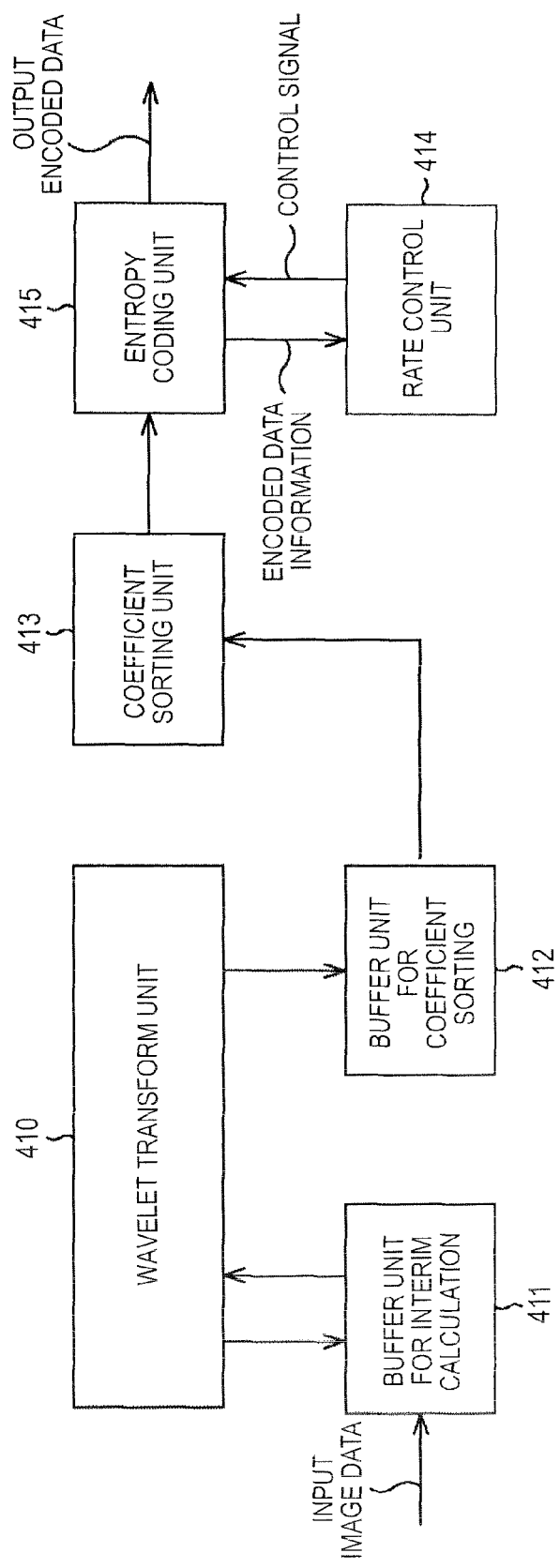
FIG. 25 is a block diagram showing another configuration example of the image coding apparatus.

FIG. 25 is a block diagram showing another configuration example of the image coding apparatus. An image coding apparatus 401 shown in FIG. 25 is an image processing apparatus which encodes image data to be inputted with low delay and outputs generated encoded data.

As shown in FIG. 25, the image coding apparatus 401 includes a wavelet transform unit 410, a buffer unit for interim calculation 411, a buffer unit for coefficient sorting 412, a coefficient sorting unit 413, a rate control unit 414 and an entropy coding unit 415.

Image data inputted to the image coding apparatus 401 is stored in the buffer unit for interim calculation 411. The wavelet transform unit 410 performs wavelet transform to image data stored in the buffer unit for interim calculation 411. That is, the wavelet transform unit 410 reads out image data from the buffer unit for interim calculation 411 and generates data of coefficients of low-pass components and high-pass components by performing filtering processing by using an analysis filter to store the generated coefficient data in the buffer for interim calculation 411.

The wavelet transform unit 410 includes a horizontal analysis filter and a vertical analysis filter, performing analysis filtering processing to the image data group in both the horizontal direction and the vertical direction of the screen. The wavelet transform unit 410 performs analysis filtering processing by using, for example, lifting operation.

The wavelet transform unit 410 reads coefficient data of low-pass components stored in the buffer unit for interim calculation 411 again and performing filtering processing to the read coefficient data by the analysis filter to thereby further generate coefficient data of high-pass components and the low-pass components. The generated coefficient data is stored in the buffer unit for interim calculation 411. That is, the wavelet transform unit 410 recursively repeats analysis filtering processing to the low-pass components, thereby hierarchizing coefficient data according to the components.

When the analysis level reaches a given level by the repetition of the above processing, the wavelet transform unit 410 reads out coefficient data from the buffer unit for interim calculation 411 and stores the read coefficient data to the buffer unit for coefficient sorting 412.

The coefficient sorting unit 413 reads out coefficient data stored in the buffer unit for coefficient sorting 412 in the order to be decoded (in the order of wavelet inverse transform) and supplies the data to the entropy coding unit 415. The entropy coding unit 415 encodes the supplied coefficient data by a given entropy coding method such as Huffman coding or arithmetic coding.

The entropy coding unit 415 operates in conjunction with the rate control unit 414, in which the bit rate of compressed encoded data to be outputted is controlled so as to be an almost constant value. That is, the rate control unit 414 supplies the entropy coding unit 415 with a control signal for performing control so that the coding processing by the entropy coding unit 415 is completed at a point when the bit rate of the compressed encoded data by the entropy coding unit 415 reaches a target value or just before reaching the target value based on encoded data information from the entropy coding unit 415. The entropy coding unit 415 outputs encoded data at a point when the coding processing is completed in response to the control signal supplied from the rate control unit 414.

The image coding apparatus 401 performs coding of the image plural times in phase by dividing processing into processing with respect to respective several lines in the vertical direction of the screen. More specifically, the image coding apparatus 401 encodes inputted image data in units of the necessary number of lines for generating coefficient data of one line of the sub-band of the lowest-pass component after the wavelet transform.

In the following description, a set of lines including other sub-bands which are necessary for generating coefficient data of one line of the sub-band of the lowest-pass component is called a line block (or a precinct). Here, the line indicates image data or coefficient data for one row formed in a picture or a field corresponding to image data before wavelet transform or in each sub-band.

Data included in the line block (precinct) may be image data, wavelet-transformed coefficient data and entropy-encoded data. That is, the line block (precinct) can be data in any state as long as data in original image data before wavelet transform corresponds to an image data group for the number of lines necessary for generating coefficient data for one line of the sub-band in the lowest-pass component after wavelet transform. For example, the line block may indicate a coefficient data group of each sub-band obtained by performing wavelet transform to the image data group.

That is, the wavelet transform unit 410 performs wavelet transform processing in units of line blocks (precincts). That is, the wavelet transform unit 410 starts the wavelet transform processing as soon as the minimum amount of input image data to which the analysis filtering processing can be performed to the lowest-pass component is accumulated in the buffer unit for interim calculation 411.

In the case of, the wavelet transform in related art, horizontal analysis filtering processing is performed to the entire picture first, and the vertical analysis filtering processing is performed to the entire picture next. Then, the same horizontal analysis filtering processing and the vertical analysis filtering processing are sequentially performed to the obtained entire low-pass components. The analysis filtering processing is recursively repeated in the above manner until an analysis level reaches the final level. Accordingly, it is necessary to allow the buffer to hold results of respective analysis filtering processing. As it is necessary that the buffer holds the filtering results of the entire picture or the entire low-pass components in the analysis level at that point, large memory capacity is necessary (the data amount to be held is large).

Additionally, when all wavelet transform is not completed in the picture in the above case, it is difficult to perform the sorting of coefficients or the entropy coding in subsequent stages, which increases delay time.

In response to the above, the wavelet transform unit 410 continuously performs the vertical analysis filtering processing and the horizontal analysis filtering processing to the final level in units of line blocks as described above, therefore, the data amount necessary to be held (buffered) at a time (at the same time) is smaller than related-art methods and the memory capacity of the buffer to be prepared can be drastically reduced. Moreover, as the analysis filtering processing is performed to the final level, processing of sorting coefficient, entropy coding and so on can be executed.

The coefficient sorting unit 413 reads out coefficient data as soon as the coefficient data to be read next time is stored in the buffer unit for coefficient sorting 412. The entropy coding unit 415 sequentially performs entropy coding to coefficient data to be supplied. Therefore, as the wavelet transform unit 410 starts outputting coefficient data with lower delay, the coefficient sorting unit 413 and the entropy coding unit 415 can also start respective processing with lower delay.

That is, encoded data can be outputted with lower delay. The above respective processing of the wavelet transform, the coefficient sorting and the entropy coding can be performed in parallel. Therefore, it is possible to drastically reduce the delay time as compared with related-art methods. That is, the image coding apparatus 401 can encode input image data as well as can output encoded data with lower delay.

The technology of the present disclosure can be applied to the above image coding apparatus 401. For example, the entropy coding unit 23 of FIG. 1 is applied to the entropy coding unit 415. Accordingly, the image coding apparatus 401 can perform coding processing with lower delay as well as can perform coding processing more easily.

That is, the image coding apparatus 401 can reduce the load in coding processing. Accordingly, the coding processing can be performed more speedily. It is also possible to realize the image coding apparatus 401 at lower costs (manufacturing costs can be reduced). Furthermore, the image coding apparatus 401 can encode zero-run portions efficiently, which can improve coding efficiency of encoding coefficient data with many zeros.

[Image Decoding Apparatus]

Figure 26:
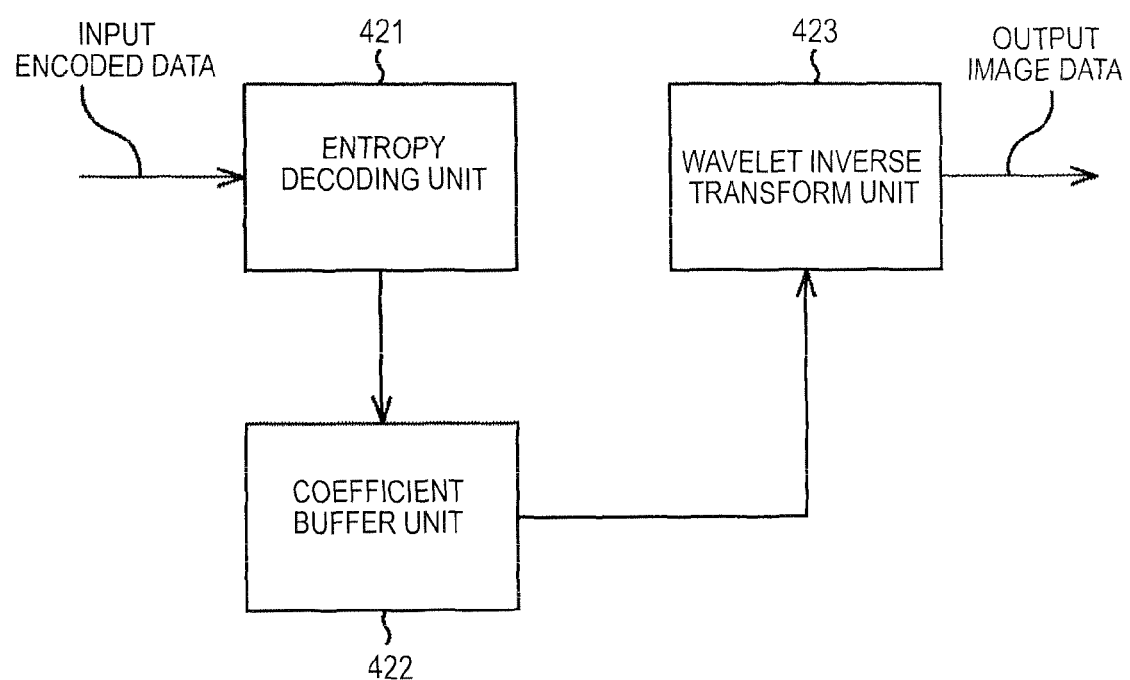
FIG. 26 is a block diagram showing another configuration example of the image decoding apparatus.

FIG. 26 is a block diagram showing another configuration example of the image decoding apparatus. An image decoding apparatus 420 shown in FIG. 26 is an image decoding apparatus corresponding to the image coding apparatus 401 of FIG. 25. That is, the image decoding apparatus 420 decodes encoded data generated by encoding image data by the image coding apparatus 401 to generate decoded image data.

As shown in FIG. 26, the image decoding apparatus 420 includes an entropy decoding unit 421, a coefficient buffer unit 422 and a wavelet inverse transform unit 423.

Encoded data inputted to the image decoding apparatus 420 is supplied to the entropy decoding unit 421. The entropy decoding unit 421 performs entropy decoding to the encoded data by a method corresponding to the entropy coding by the entropy coding unit 415 to restore coefficient data before the entropy coding. The entropy decoding unit 421 supplies the coefficient data to the coefficient buffer unit 422 to be stored therein.

The wavelet inverse transform unit 423 reads out coefficient data stored in the coefficient buffer unit 422, performs combined filtering processing in the vertical direction and the horizontal direction respectively and stores the result of the combined filtering processing to the coefficient buffer unit 422 again. The wavelet inverse transform unit 423 repeats the processing in accordance with the analysis level to obtain decoded image data (output image data). The wavelet inverse transform unit 423 outputs the generated decoded image data to the outside of the image decoding apparatus 420.

As the coefficient data is sorted in the order of wavelet inverse transform by the coefficient sorting unit 413 of the image coding apparatus 401 in this case, the wavelet inverse transform unit 423 can sequentially read out coefficients to be stored in the coefficient buffer unit 422 to be used for the combined filtering processing. That is, the wavelet inverse transform unit 423 can perform wavelet inverse transform with lower delay.

Accordingly, the image decoding apparatus 420 can decode encoded data with lower delay and output decoded image data.

The technology of the present disclosure can be applied to the above image decoding apparatus 420. For example, the entropy decoding unit 121 of FIG. 16 is applied to the entropy decoding unit 421. Accordingly, the image decoding apparatus 420 can perform decoding processing with lower delay as well as can perform decoding processing more easily.

That is, the image decoding apparatus 420 can reduce the load in decoding processing. Accordingly, the decoding processing can be performed more speedily. It is also possible to realize the image decoding apparatus 420 at lower costs (manufacturing costs can be reduced). Furthermore, the image decoding apparatus 420 can realize more efficient coding of zero-run portions, which can improve coding efficiency of encoding of coefficient data with many zeros.

[Flow of Encoding/Decoding]

A data transmission system capable of transmitting data with lower delay can be realized by using the above image coding apparatus 401 and the image decoding apparatus 420.

In the data transmission, it is effective that data is transmitted by encoding data and is decoded in a transmission destination for improving the transmission efficiency.

In the data transmission system in which image data is transmitted by encoding data, the image coding apparatus 401 is applied as the image coding apparatus of a transmission source and the image decoding apparatus 420 is applied as the image decoding apparatus of the transmission destination. According to the configuration, encoding/decoding can be realized with lower delay as described above, therefore, data transmission with lower delay can be realized.

More specific explanation will be made. FIGS. 27A to 27C are diagrams for explaining an example of the flow in which image data is encoded by the image coding apparatus 401 and the encoded data is decoded by the image decoding apparatus 420. FIGS. 27A to 27C is an example in which filtering processing is performed by the wavelet transform until reaching the analysis level=2 by using a 5×3 filter. In the wavelet transform unit 410, the first analysis filtering processing is performed in the horizontal and vertical directions respectively with respect to the first line to the seventh line of inputted image data as shown in FIG. 27A as an example (In-I of FIG. 27A).

In the processing of an analysis level=1 in the first analysis filtering processing, coefficient data for three lines is generated, which is arranged at an area HH, an area HL and an area LH formed in the analysis level=1 respectively as shown in FIG. 27B as an example (WT-1 of FIG. 27B)

An area LL formed in the analysis level=1 is further divided into four by the analysis filtering processing in the horizontal and vertical directions by an analysis level=2. The coefficient data generated in the analysis level=2 is arranged in each one line respectively at the area LL, the area HH, the area HL and the area LH inside the area LL by the analysis level=1.

In the filtering processing after the second time by the wavelet transform unit 410, the filtering processing is performed every four lines (In-2 . . . of FIG. 27A), coefficient data is generated in units of two lines in the analysis level=1 (WT-2 of FIG. 27B) and coefficient data is generated line by line in the analysis level=2.

When the wavelet-transformed data is decoded as in FIG. 27B, the first line by the first combining processing on the decoding side is outputted with respect to the first filtering processing by the first line to the seventh line on the coding side as shown in FIG. 27C as an example (Out-1 of FIG. 270) After that, data is outputted in units of four lines on the decoding side with respect to the filtering processing from the second time to the time previous to the last time on the coding side (Out–2 . . . of FIG. 270). Then, seven lines are outputted on the decoding side with respect to the filtering processing at the last time on the coding side.

As described above, the coding processing by the image coding apparatus 401 and the decoding processing by the image decoding processing 420 can be performed in units of line blocks, and can be performed in parallel. Therefore, the delay time counted from the input of image data in the image coding apparatus 401 to the output of decoded image data from the image decoding apparatus 420 can be drastically reduced. That is, data transmission with lower delay can be realized.

It is possible to realize the coding processing and the decoding processing more easily by applying the technology of the present disclosure to the image coding apparatus 401 and the image decoding apparatus 420 in the above data transmission system as described above. It is also possible to improve coding efficiency of encoding coefficient data with many zeros, therefore, the transmission efficiency can be further improved.

Configurations of the image coding apparatus 401 and the image decoding apparatus 420 are not limited to the above examples as long as the technology of the present disclosure can be applied. For example, the sorting of coefficients may be performed in the image decoding apparatus 420. Additionally, other transform processing (inverse transform processing) can be applied instead of the wavelet transform processing (wavelet inverse transform processing). Furthermore, quantization/inverse quantization can be performed to coefficient data.

As a specific example of the above data transmission system, for example, there exists a digital triax system in which plural signals such as a video signal, an audio signal, a video signal of return and a synchronized signal are superimposed to be transmitted as well as power supply is performed by one coaxial cable connecting a video camera to a camera control unit or a switcher at the time of studio recording or rebroadcasting in a television broadcasting station or a production studio.

The data transmission system can be also applied to arbitrary systems, for example, a television conference system, a communication system between a home game machine and peripheral device such as a video camera and a monitor, and so on. The data transmission system, can be further applied to data transmission between processing units inside the apparatus.

That is, the technology of the present disclosure can be applied to various systems transmitting encoded data obtained by encoding image data.

4. Fourth Embodiment

[Personal Computer]

The above series of processing can be executed by hardware as well as software. In this case, for example, a personal computer shown in FIG. 28 can be configured.

In FIG. 28, a CPU (Central Processing Unit) 601 of a personal computer 600 executes various processing in accordance with programs stored in a ROM (Random Access Memory) 602 or programs loaded from a storage unit 613 to a RAM (Random Access Memory) 603. Data necessary for executing various processing by the CPU 601 and so on are appropriately stored in the RAM 603.

The CPU 601, the ROM 602 and the RAM 603 are mutually connected through a bus 604. An input/output interface 610 is also connected to the bus 604.

Also to the input/output interface 610, an input unit 611 including a keyboard, a mouse and so on, an output unit 612 including displays such as a CRT (Cathode Ray Tube) display or a LCD (Liquid Crystal Display), a speaker and so on, a storage unit 613 including SSD (Solid State Drive) such as a flash memory, a hard disk and so on and a communication unit 614 including interfaces, modems of a wired LAN (Local Area Network) or wireless LAN are connected. The communication unit 614 performs communication processing through networks including Internet.

A drive 615 is connected to the input/output interface 610 if necessary, on which removable media 621 such as a magnetic disc, an optical disc, a magneto-optic disc or a semiconductor memory is mounted. The computer program read out from the media is installed in the storage unit 613 according to need.

When the above series of processing is executed by software, programs included in the software are installed from networks or recording media.

The recording media is formed by not only the removable media 621 including the magnetic disc (including a flexible disc), the optical disc (including a CD-ROM (Compact Disc-Read Only Memory) and a DVD (Digital Versatile Disc)), the magneto-optic disc (including a MD (Mini Disc)) or the semiconductor memory, in which programs are recorded, which is distributed by delivering programs to the user separately from the apparatus body, but also the ROM 602, the hard disk included in the storage unit 613, which is delivered to the user in a state of previously being incorporated in the apparatus.

The program executed by the computer may be a program processed in time series along the order explained in the present specification or a program processed in parallel or at necessary timing such as calling is performed.

In the present specification, steps describing the program to be recorded in the recording media include processing performed in time series along the described order as well as processing executed in parallel or individually, not always being processed in time series.

In the present specification, the system represents the entire apparatus including plural devices.

In the above description, a configuration explained as one apparatus (or a processing unit) may be configured as plural apparatuses (or processing units). Conversely, a configuration as plural apparatuses (or processing units) in the above description may be integrally configured as one apparatus (or a processing unit). It is naturally possible to add a configuration other than the above to the configuration of each apparatus (or each processing unit). Furthermore, part of the configuration of a certain apparatus (or a processing unit) is included in the configuration of another apparatus (or another processing unit) as long as the configuration and operation as the entire system are substantially the same. That is, the embodiment of the present disclosure is not limited to the above embodiments and can be variously altered in a range not departing from the gist of the present disclosure.

The technology of the present disclosure can apply the following configurations.

(1) An image processing apparatus including a number of significant digits coding unit encoding information concerning the maximum number of significant digits as the number of significant digits of coefficient data having the largest absolute value in each of groups set in units of the predetermined number of plural coefficient data generated from image data, a zero-run coding unit encoding zero-run formed by a group including only coefficient data a value of which is "0", an absolute value coding unit encoding absolute values of respective coefficient data other than zero-run with respect to each group, and a sign coding unit encoding positive and negative signs of respective coefficient data other than zero-run with respect to each group.

(2) The image processing apparatus described in the above (1), in which the zero-run coding unit generates a code including codes "0" corresponding to a number obtained by subtracting 1 from the number of digits of the number of groups forming zero-run in binary expression and the number of groups in binary expression.

(3) The image processing apparatus described in the above (2), in which the zero-run coding unit generates a code including codes "0" corresponding to the number of digits of a number in binary expression obtained by subtracting 1 from the number of groups forming zero-run and a code "1", when the zero-run continues to the end of a line to be processed.

(4) The image processing apparatus described in the above (2), in which the zero-run coding unit generates a code including codes "0" corresponding to the number of digits of a number in binary expression obtained by subtracting 1 from the number of groups forming zero-run, when the zero-run continues to the end of a line to be processed.

(5) The image processing apparatus described in the above (1), in which the number of significant digits coding unit generates a code indicating a variation between the maximum number of significant digits in a present group to be processed and the maximum number of significant digits in a previous group processed last time.

(6) The image processing apparatus described in the above (5), in which the number of significant digits coding unit generates codes "0" corresponding to a number obtained by subtracting 1 from the variation as a code indicating the variation and the code "1" indicating the end of change.

(7) The image processing apparatus described in the above (6), in which the number of significant digits coding unit generates only codes "0" corresponding to a number obtained by subtracting 1 from the variation as a code indicating the variation when the maximum number of significant digits in the present group is "0"

(8) The image processing apparatus described in the above (5), in which the number of significant digits coding unit further generates a code indicating whether the maximum number of significant digits in the present group has been changed from the maximum number of significant digits in the previous group as well as a code indicating whether the maximum number of significant digits in the present group has been increased or reduced as compared with the maximum number of significant digits in the previous group.

(9) The image processing apparatus described in the above (8), in which the number of significant digits coding unit further generates the code indicating whether the maximum number of significant digits in the present group has been changed from the maximum number of significant digits in the previous group as well as the code indicating whether the maximum number of significant digits in the present group has been increased or reduced as compared with the maximum number of significant digits in the previous group only when the maximum number of significant digits of the previous group is not "0".

(10) The image processing apparatus described in the above (1), further including a wavelet transform unit performing wavelet transform to image data, and a quantization unit quantizing wavelet coefficients obtained by performing wavelet transform to image data by the wavelet transform unit, in which the number of significant digits coding unit, the zero-run coding unit, the absolute value coding unit and the sign coding unit respectively encode quantized coefficients obtained by quantizing the wavelet coefficients by the quantization unit.

(11) An image processing method of an image processing apparatus, including encoding information concerning the maximum number of significant digits as the number of significant digits of coefficient data having the largest absolute value in each of groups set in units of the predetermined number of plural coefficient data generated from image data by a number of significant digits coding unit, encoding zero-run formed by a group including only coefficient data a value of which is "0" by a zero-run coding unit, encoding absolute values of respective coefficient data other than zero-run with respect to each group by an absolute value coding unit, and encoding positive and negative signs of respective coefficient data other than zero-run with respect to each group by a sign coding unit.

(12) An image processing apparatus including a number of significant digits decoding unit decoding a code generated in each of groups set in units of the predetermined number of plural coefficient data, which indicates the maximum number of significant digits as the number of significant digits of coefficient data having the largest absolute value in each group, a zero-run decoding unit decoding a code indicating zero-run formed by a group including only coefficient data a value of which is "0", an absolute value decoding unit decoding a code indicating absolute values of respective coefficient data, which has been generated with respect to each group of coefficient data other than zero-run, and a sign decoding unit decoding a code indicating positive and negative signs of respective coefficient data, which has been generated with respect to each group of coefficient data other than zero-run.

(13) The image processing apparatus described in the above (12), in which the zero-run decoding unit decodes the code indicating zero-run when the maximum number of significant digits in a present group to be processed is "0" as the result of decoding by the number of significant digits decoding unit.

(14) The image processing apparatus described in the above (13), in which the zero-run decoding unit performs a first reading in which codes are sequentially read until a code "1" is read or codes are read to the end of a line, performs a second reading in which codes corresponding to the number of codes "0" read in the first reading are further read in the case where zero-run indicated by the codes read in the first reading does not reach the end of the line, and generates the number of coefficient data with the value "0" corresponding to a number binary expression of which is equivalent to a code string obtained by adding the code "1" to the head of the codes read in the first reading.

(15) The image processing apparatus described in the above (14), in which the zero-run decoding unit generates coefficient data the value of which is "0" corresponding to a number reaching the end of the line in the case where zero-run indicated by the codes read in the first reading reaches the end of the line.

(16) The image processing apparatus described in the above (14), in which the number of significant digits decoding unit sequentially reads codes until the code "1" is read after the second reading by the zero-run decoding unit, setting a number obtained by adding 1 to the number of read codes "0" to the maximum number of significant digits of a group subsequent to the group forming zero-run.

(17) The image processing apparatus described in the above (12), further including an inverse quantization unit performing inverse quantization to quantization coefficients values of which are "0" obtained as a result of decoding by the zero-run decoding unit, or quantized coefficients including absolute values obtained as a result of decoding by the absolute value decoding unit and signs obtained as a result of decoding by the sign decoding unit, and a wavelet inverse transform unit performing wavelet inverse transform to wavelet coefficients obtained by inversely quantizing the quantized coefficients by the inverse quantization unit.

(18) An image processing method of an image processing apparatus including, decoding a code generated in each of groups set in units of the predetermined number of plural coefficient data, which indicates the maximum number of significant digits as the number of significant digits of coefficient data having the largest absolute value in each group by a number of significant digits decoding unit, decoding a code indicating zero-run formed by a group including only coefficient data a value of which is "0" by a zero-run decoding unit, decoding a code indicating absolute values of respective coefficient data, which has been generated with respect to each group of coefficient data other than zero-run by an absolute value decoding unit, and decoding a code indicating positive and negative signs of respective coefficient data, which has been generated with respect to each group of coefficient data other than zero-run by a sign decoding unit.

The present disclosure contains subject matter related to that disclosed in Japanese Priority Patent Application JP 2011-280577 filed in the Japan Patent Office on Dec. 21, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a number of significant digits coding unit encoding information concerning the maximum number of significant digits as the number of significant digits of coefficient data having the largest absolute value in each of groups set in units of the predetermined number of plural coefficient data generated from image data;

a zero-run coding unit encoding zero-run formed by a group including only coefficient data a value of which is "0";

an absolute value coding unit encoding absolute values of respective coefficient data other than zero-run with respect to each group; and a sign coding unit encoding positive and negative signs of respective coefficient data other than zero-run with respect to each group.

2. The image processing apparatus according to claim 1, wherein the zero-run coding unit generates a code including codes "0" corresponding to a number obtained by subtracting 1 from the number of digits of the number of groups forming zero-run in binary expression and the number of groups in binary expression.

3. The image processing apparatus according to claim 2, wherein the zero-run coding unit generates a code including codes "0" corresponding to the number of digits of a number in binary expression obtained by subtracting 1 from the number of groups forming zero-run and a code "1", when the zero-run continues to the end of a line to be processed.

4. The image processing apparatus according to claim 2, wherein the zero-run coding unit generates a code including codes "0" corresponding to the number of digits of a number in binary expression obtained by subtracting 1 from the number of groups forming zero-run, when the zero-run continues to the end of a line to be processed.

5. The image processing apparatus according to claim 1, wherein the number of significant digits coding unit generates a code indicating a variation between the maximum number of significant digits in a present group to be processed and the maximum number of significant digits in a previous group processed last time.

6. The image processing apparatus according to claim 5, wherein the number of significant digits coding unit generates codes "0" corresponding to a number obtained by subtracting 1 from the variation as a code indicating the variation and the code "1" indicating the end of change.

7. The image processing apparatus described according to claim 6,
wherein the number of significant digits coding unit generates only codes "0" corresponding to a number obtained by subtracting 1 from the variation as a code indicating the variation when the maximum number of significant digits in the present group is "0".

8. The image processing apparatus according to claim 5, wherein the number of significant digits coding unit further generates a code indicating whether the maximum number of significant digits in the present group has been changed from the maximum number of significant digits in the previous group as well as a code indicating whether the maximum number significant digits in the present group has been increased or reduced as compared with the maximum number of significant digits in the previous group.

9. The image processing apparatus according to claim 8, in which the number of significant digits coding unit further generates the code indicating whether the maximum number of significant digits in the present group has been changed from the maximum number of significant digits in the previous group as well as the code indicating whether the maximum number of significant digits in the present group has been increased or reduced as compared with the maximum number of significant digits in the previous group only when the maximum number of significant digits of the previous group is not "0".

10. The image processing apparatus according to claim 1, further comprising:
   a wavelet transform unit performing wavelet transform to image data; and
   a quantization unit quantizing wavelet coefficients obtained by performing wavelet transform to image data by the wavelet transform unit,
   in which the number of significant digits coding unit, the zero-run coding unit, the absolute value coding unit and the sign coding unit respectively encode quantized coefficients obtained by quantizing the wavelet coefficients by the quantization unit.

11. An image processing method of an image processing apparatus comprising:
   encoding information concerning the maximum number of significant digits as the number of significant digits of coefficient data having the largest absolute value in each of groups set in units of the predetermined number of plural coefficient data generated from image data by a number of significant digits coding unit;
   encoding zero-run formed by a group including only coefficient data a value of which is "0" by a zero-run coding unit;
   encoding absolute values of respective coefficient data other than zero-run with respect to each group by an absolute value coding unit; and
   encoding positive and negative signs of respective coefficient data other than zero-run with respect to each group by a sign coding unit.

12. An image processing apparatus comprising:
   a number of significant digits decoding unit decoding a code generated in each of groups set in units of the predetermined number of plural coefficient data, which indicates the maximum number of significant digits as the number of significant digits of coefficient data having the largest absolute value in each group;
   a zero-run decoding unit decoding a code indicating zero-run formed by a group including only coefficient data a value of which is "0";
   an absolute value decoding unit decoding a code indicating absolute values of respective coefficient data, which has been generated with respect to each group of coefficient data other than zero-run; and
   a sign decoding unit decoding a code indicating positive and negative signs of respective coefficient data, which has been generated with respect to each group of coefficient data other than zero-run.

13. The image processing apparatus according to claim 12, wherein the zero-run decoding unit decodes the code indicating zero-run when the maximum number of significant digits in a present group to be processed is "0" as the result of decoding by the number of significant digits decoding unit.

14. The image processing apparatus according to claim 13, wherein the zero-run decoding unit performs a first reading in which codes are sequentially read until a code "1" is read or codes are read to the end of a line, performs a second reading in which codes corresponding to the number of codes "0" read in the first reading are further read in the case where zero-run indicated by the codes read in the first reading does not reach the end of the line, and generates the number of coefficient data with the value "0" corresponding to a number binary expression of which is equivalent to a code string obtained by adding the code "1" to the head of the codes read in the first reading.

15. The image processing apparatus according to claim 14, wherein the zero-run decoding unit generates coefficient data the value of which is "0" corresponding to a number reaching the end of the line in the case where zero-run indicated by the codes read in the first reading reaches the end of the line.

16. The image processing apparatus according to claim 14, wherein the number of significant digits decoding unit sequentially reads codes until the code "1" is read after the second reading by the zero-run decoding unit, setting a number obtained by adding 1 to the number of read codes "0" to the maximum number of significant digits of a group subsequent to the group forming zero-run.

17. The image processing apparatus according to claim 12, further comprising:
   an inverse quantization unit performing inverse quantization to quantization coefficients values of which are "0" obtained as a result of decoding by the zero-run decoding unit, or quantized coefficients including absolute values obtained as a result of decoding by the absolute value decoding unit and signs obtained as a result of decoding by the sign decoding unit; and
   a wavelet inverse transform unit performing wavelet inverse transform to wavelet coefficients obtained by inversely quantizing the quantized coefficients by the inverse quantization unit.

18. An image processing method of an image processing apparatus comprising:
   decoding a code generated in each of groups set in units of the predetermined number of plural coefficient data, which indicates the maximum number of significant digits as the number of significant digits of coefficient data having the largest absolute value in each group by a number of significant digits decoding unit;
   decoding a code indicating zero-run formed by a group including only coefficient data a value of which is "0" by a zero-run decoding unit;
   decoding a code indicating absolute values of respective coefficient data, which has been generated with respect to each group of coefficient data other than zero-run by an absolute value decoding unit; and
   decoding a code indicating positive and negative signs of respective coefficient data, which has been generated with respect to each group of coefficient data other than zero-run by a sign decoding unit.

* * * * *